United States Patent
Frenne et al.

(10) Patent No.: US 10,966,246 B2
(45) Date of Patent: Mar. 30, 2021

(54) COLLISION AVOIDANCE BETWEEN EPDCCH AND APERIODIC CSI-RS

(71) Applicant: Telefonaktiebolaget LM Ericsson (Publ), Stockholm (SE)

(72) Inventors: Mattias Frenne, Uppsala (SE); Shiwei Gao, Nepean (CA); Robert Mark Harrison, Grapevine, TX (US); Florent Munier, Västra Frölunda (SE); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 9 days.

(21) Appl. No.: 15/578,365

(22) PCT Filed: Oct. 20, 2017

(86) PCT No.: PCT/IB2017/056554
§ 371 (c)(1),
(2) Date: Nov. 30, 2017

(87) PCT Pub. No.: WO2018/073813
PCT Pub. Date: Apr. 26, 2018

(65) Prior Publication Data
US 2018/0295650 A1    Oct. 11, 2018

Related U.S. Application Data

(60) Provisional application No. 62/411,413, filed on Oct. 21, 2016, provisional application No. 62/418,009, filed on Nov. 4, 2016.

(51) Int. Cl.
*H04W 4/00*      (2018.01)
*H04W 74/08*    (2009.01)
(Continued)

(52) U.S. Cl.
CPC ......... *H04W 74/0816* (2013.01); *H04L 5/005* (2013.01); *H04L 5/0048* (2013.01);
(Continued)

(58) Field of Classification Search
CPC ........... H04W 74/0816; H04W 72/042; H04W 72/0446; H04L 5/0048; H04L 5/005; H04L 5/0089; H04L 5/0094; H04L 5/0007
See application file for complete search history.

(56) References Cited

U.S. PATENT DOCUMENTS

2013/0083753 A1    4/2013  Lee et al.
2015/0131554 A1*   5/2015  Jiang .................. H04W 72/042
                                                                    370/329
(Continued)

FOREIGN PATENT DOCUMENTS

EP    3 497 867 A1    2/2018
JP    2019-530276 A   10/2019
(Continued)

OTHER PUBLICATIONS

Huawei (R1-1608601, Oct. 10-14, 2016, Enhancement on rate matching for different transmission modes). (Year: 2016).*
(Continued)

*Primary Examiner* — Maharishi V Khirodhar
(74) *Attorney, Agent, or Firm* — Christopher & Weisberg, P.A.

(57) ABSTRACT

Methods, wireless devices and network nodes for avoiding collision between a downlink control channel and a aperiodic channel state information reference signal, aperiodic CSI-RS, are provided. According to some aspects, a method is provided that includes receiving an aperiodic channel state information reference signal, aperiodic CSI-RS, based on an assumption that the aperiodic CSI-RS is not present in
(Continued)

physical layer resources corresponding to a downlink control channel set.

18 Claims, 17 Drawing Sheets

(51) Int. Cl.
*H04W 72/04* (2009.01)
*H04L 5/00* (2006.01)
(52) U.S. Cl.
CPC .......... *H04L 5/0089* (2013.01); *H04L 5/0094* (2013.01); *H04W 72/042* (2013.01); *H04W 72/0446* (2013.01); *H04L 5/0007* (2013.01)

(56) References Cited

U.S. PATENT DOCUMENTS

| | | | |
|---|---|---|---|
| 2015/0162966 A1* | 6/2015 | Kim | H04B 7/0456 370/252 |
| 2015/0249952 A1 | 9/2015 | Lee et al. | |
| 2015/0304994 A1* | 10/2015 | Kim | H04L 5/0048 370/280 |
| 2016/0227519 A1 | 8/2016 | Nimbalker et al. | |
| 2016/0227548 A1 | 8/2016 | Nimbalker et al. | |
| 2018/0098234 A1* | 4/2018 | Kim | H04L 5/0053 |
| 2018/0167122 A1* | 6/2018 | Gao | H04B 7/0413 |
| 2018/0241532 A1* | 8/2018 | Kakishima | H04B 7/0626 |
| 2020/0059967 A1* | 2/2020 | Kim | H04L 5/0023 |

FOREIGN PATENT DOCUMENTS

| | | |
|---|---|---|
| WO | 2016/119192 A1 | 8/2016 |
| WO | 2018/031727 A1 | 2/2018 |

OTHER PUBLICATIONS

3GPP_TSG_RAN_WG1 Archives , Oct. 2016 (Year: 2016).*
International Search Report and Written Opinion dated Oct. 12, 2015 for International Application Serial No. PCT/SE2015/050512, International Filing Date: May 7, 2015 consisting of 13-pages.
3GPP TSG-RAN WG2 #85, R2-140964, 36.306_CR 0172, Current Version 11.5.0, Title: "Introduction of Category 0 for Low Cost MTC," Source to WG: Huawei, HiSilicon, Source to TSG: R2, Work item code: LC_MTC_LTE-Core, Category: B, Release: Rel-12, Conference Location and Date: Prague, Czech Republic Feb. 10-14, 2014 consisting of 3-pages.
3GPP TSG-RAN WG2 #86 Tdoc, R2-142120, Title: "Handling of Low Complexity UE Categories During Handover," Agenda Item: 7.7, Source: Ericsson, Document for Discussion, Decision, Conference Location and Date: Seoul, South Korea, May 19-23, 2014 consisting of 4-pages.
3GPP TS 36.211 V13.0.0 (Dec. 2015) 3rd Generation Partnership Project; Technical Specification Group Radio Access Network; Evolved Universal Terrestrial Radio Access (E-UTRA); Physical Channels and Modulation (Release 13) Jan. 6, 2016 consisting of 141-pages.
3GPP TS 36.212 V13.0.0 (Dec. 2015) 3rd Generation Partnership Project; Technical Specification Group Radio Access Network; Evolved Universal Terrestrial Radio Access (E-UTRA); Multiplexing and Channel Coding (Release 13) Jan. 6, 2016 consisting of 121-pages.
3GPP TS 36.213 V13.0.1 (Jan. 2016) 3rd Generation Partnership Project; Technical Specification Group Radio Access Network; Evolved Universal Terrestrial Radio Access (E-UTRA); Physical Layer Procedures (Release 13) Jan. 27, 2016 consisting of 326-pages.
3GPP TSG-RAN WG1 #86, R1-167637, Title: "UE specific Beamforming with Aperiodic CSI-RS Transmission," Source: Ericsson, Agenda Item: 7.2.4.1.2, Document for: Discussion and Decision, Conference Location and Date: Gothenburg, Sweden, Aug. 22-26, 2016 consisting of 6-pages.
3GPP TSG RAN WG1 Meeting #86 R1-166055, Title: "Draft Agenda," Source: Chairman, Document for: Decision, Conference Location and Date: Gothenburg, Sweden, Aug. 22-26, 2016 consisting of 8-pages.
3GPP TS 36.321 V13.2.0 (Jun. 2016) 3rd Generation Partnership Project; Technical Specification Group Radio Access Network; Evolved Universal Terrestrial Radio Access (E-UTRA); Medium Access Control (MAC) Protocol Specification (Release 13) Jul. 7, 2016 consisting of 91-pages.
Notification of Transmittal of the International Preliminary Report on Patentability dated Jan. 23, 2019 issued in corresponding PCT Application No. PCT/IB2017/056554 consisting of 19 pages.
International Search Report and Written Opinion of the International Searching Authority dated Feb. 2, 2018 issued in corresponding PCT Application Serial No. PCT/IB2017/056554, consisting of 18 pages.
Huawei, Hisilicon, 3GPP TSG RAN WG1 Meeting #86bis—R1-1608601, Enhancement on Rate Matching for Different Transmission Modes; Document for Discussion and Decision; Lisbon, Portugal, Oct. 10-14, 2016, consisting of 6 pages.
Ericsson, 3GPP TSG RAN WG1 Meeting #86bis—R1-1609763, Aperiodic CSI and CSI-RS Resource Pooling; Document for Discussion and Decision; Lisbon, Portugal, Oct. 10-14, 2016, consisting of 4 pages.
Interdigital Communications, 3GPP TSG RAN WG1 Meeting #86bis R1-1610105, PDSCH Rate-Matching for A-CSI-RS; Document for Discussion and Decision; Lisbon, Portugal, Oct. 10-14, 2016, consisting of 4 pages.
"Interdigital Communications, 3GPP TSG RAN WG1 Meeting #86bis—R1-1608604, A-CSI-RS Impacts on EPDCCH; Document for Discussion and Decision; Lisbon, Portugal, Oct. 10-14, 2016, consisting of 6 pages."
"Interdigital Communications, 3GPP TSG RAN WG1 Meeting #86bis—R1-1610104, A-CSI-RS Impacts on EPDCCH; Document for Discussion and Decision; Lisbon, Portugal, Oct. 10-14, 2016, consisting of 6 pages."
Japanese Office Action and English Summary thereof dated Sep. 7, 2020 issued in corresponding Japanese Application No. 2019-521474, consisting of 7 pages.
Ericsson 3GPP TS-RAN WG1 #81bis, R1-1609846; Title: On Rate Matching for Beamformed CSI-RS; Agenda Item: 7.2.2.5.1; Document for: Discussion and Decision; Lisbon, Portugal Oct. 10-14, 2016, consisting of 7 pages.
Indian Examination Report dated Sep. 30, 2020 issued in Indian Patent Application No. 201937015475, consisting of 7 pages.
Korean Office Action and English translation thereof dated Sep. 2, 2020 issued in corresponding Korean Application No. 10-2019-7014552 consisting of 10 pages.
Samsung, 3GPP TSG RAN WG1 #83; R1-156767; Title: LAA Control Signaling Details; Agenda Item: 6.2.3.3; Document for: Discussion and Decision; Anaheim, USA, Nov. 15-22, 2015, consisting of 5 pages.
Colombian Office Action and English translation thereof dated Jun. 26, 2020 issued in corresponding Application No. NC2019/0003969 consisting of 15 pages.

* cited by examiner

COLLISION AVOIDANCE BETWEEN EPDCCH AND APERIODIC CSI-RS

CROSS-REFERENCE TO RELATED APPLICATIONS

This application is a Submission Under 35 U.S.C. § 371 for U.S. National Stage Patent Application of International Application Number PCT/IB2017/056554, filed Oct. 20, 2017 entitled "COLLISION AVOIDANCE BETWEEN DOWNLINK CONTROL CHANNELS AND APERIODIC CHANNEL STATE INFORMATION-REFERENCE SIGNALS" which claims priority to U.S. Provisional Application No. 62/411,413 filed Oct. 21, 2016 entitled "COLLISION AVOIDANCE BETWEEN EPDCCH AND APERIODIC CSI-RS" and U.S. Provisional Application No. 62/418,009 filed Nov. 4, 2016 entitled "COLLISION AVOIDANCE BETWEEN EPDCCH AND APERIODIC CSI-RS", all which are incorporated herein by reference in their entirety.

TECHNICAL FIELD

The disclosure relates to methods, network nodes, wireless devices, computer programs and computer program products thereof for configuring aperiodic channel state information reference signals (CSI-RS and, in particular, for avoiding collision between downlink control channel and aperiodic channel state information reference signals (CSI-RS).

BACKGROUND

Long-Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. [3GPP TS 36.211 Technical Specification Group Radio Access Network; Evolved Universal Terrestrial Radio Access (E-UTRA); Physical channels and modulation (Release 13); V13.0.0 (2016-01)].

In the time domain, LTE downlink transmissions are organized into radio frames of 10 ms, each radio frame consisting of ten equally-sized subframes of length $T_{subframe}=1$ ms as shown in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the base station transmits control information indicating to which terminals data is transmitted and upon which resource blocks the data is transmitted, in the current downlink subframe. This control signalling is typically transmitted in the first 1, 2, 3 or 4 OFDM symbols in each subframe. A downlink system with 3 OFDM symbols used for control is illustrated in FIG. 3.

Physical Channels and Transmission Modes

In LTE, a number of physical downlink (DL) channels are supported. A downlink physical channel corresponds to a set of resource elements carrying information originating from higher layers. The following are some of the physical channels supported in LTE:

Physical Downlink Shared Channel, PDSCH
Physical Downlink Control Channel, PDCCH
Enhanced Physical Downlink Control Channel, EPDCCH The PDSCH is used mainly for carrying user traffic data and higher layer messages. The PDSCH is transmitted in a DL subframe outside of the control region as shown in FIG. 3. Both the PDCCH and the EPDCCH are used to carry Downlink Control Information (DCI) such as Physical Resource Block (PRB) allocation, modulation level and coding scheme (MCS), precoder used at the transmitter, and etc. The PDCCH is transmitted in the first one to four OFDM symbols in a DL subframe, i.e. the control region, while the EPDCCH is transmitted in the same region as the PDSCH.

Similarly, the following physical UL channels are supported:

Physical Uplink Shared Channel, PUSCH
Physical Uplink Control Channel, PUCCH

Different DCI formats are defined in LTE for DL and uplink (UL) data scheduling. For example, DCI formats 0 and 4 are used for UL data scheduling while DCI formats 1, 1A, 1B, 1C, 1D, 2, 2A, 2B, 2C, 2D [3GPP TS 36.212 Technical Specification Group Radio Access Network; Evolved Universal Terrestrial Radio Access (E-UTRA); Multiplexing and channel coding (Release 13); V13.0.0 (2016-01)] are used for DL data scheduling. In DL, which DCI format is used for data scheduling is associated with a DL transmission scheme and/or the type of message to be transmitted. The following are some of the transmission schemes supported in LTE.

Single-antenna port
Transmit diversity (TxD)
Open-loop spatial multiplexing
Close-loop spatial multiplexing
Up to 8 layer transmission The PDCCH is always transmitted with either the single-antenna port or Transmit Diversity scheme while the PDSCH can use any one of the transmission schemes. In LTE, a User Equipment (UE) or wireless device (WD) is configured with a transmission mode (TM), rather than a transmission scheme. There are 10 TMs, i.e. TM1 to TM10, defined so far for the PDSCH in LTE. Each TM defines a primary transmission scheme and a backup transmission scheme. The backup transmission scheme is either single antenna port or TxD. The following is a list of some primary transmission schemes in LTE:

TM1: single antenna port, port 0
TM2: TxD
TM3: open-loop SM
TM4: close-loop SM
TM9: up to 8 layer transmission, port 7-14
TM10: up to 8 layer transmission, port 7-14

In TM1 to TM6, a cell specific reference signal (CRS) is used as the reference signal for both channel state information feedback and for demodulation at a WD. While in TM7 to TM10, a wireless device specific demodulation reference signal (DMRS) is used as the reference signal for demodulation.

The term wireless device or user equipment (a.k.a. UE) used herein may refer to any type of wireless device communicating with a network node and/or with another wireless device in a cellular or mobile communication system. Examples of a wireless device are target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

Enhanced Physical Downlink Control Channel (EPDCCH)

Messages transmitted over the radio link to users can be broadly classified as control messages or data messages. Control messages are used to facilitate the proper operation of the system as well as proper operation of each wireless device within the system. Control messages could include commands to control functions such as the transmitted power from a WD, signalling of PRBs within which the data is to be received by the wireless device or transmitted from the wireless device and so on.

For wireless devices of Rel-11 or later, the wireless device can be configured to monitor the EPDCCH in addition to the PDCCH [3GPP TS 36.211, 3GPP TS 36.213 Technical Specification Group Radio Access Network; Evolved Universal Terrestrial Radio Access (E-UTRA); Physical layer procedures (Release 13); V13.0.1 (2016-01)].

The enhanced physical downlink control channel (EPDCCH) was thus introduced in Rel-11, in which 2, 4 or 8 PRB pairs in the data region are reserved to exclusively contain EPDCCH transmissions, although excluding from the PRB pair(s) the one to four first symbols that may contain control information to wireless devices of releases earlier than Rel-11. See an illustration in FIG. 4.

Hence, the EPDCCH is frequency multiplexed with PDSCH transmissions in contrast to the PDCCH which is time multiplexed with PDSCH transmissions. Note also that multiplexing of the PDSCH and any EPDCCH transmission within a PRB pair is not supported in LTE Rel-11. The advantages of the EPDCCH over the PDCCH is that it allows support for increased control channel capacity, support for improved spatial reuse of control channel resources, support for wireless device specific precoding etc.

Furthermore, two modes of EPDCCH transmission are supported, the localized and the distributed EPDCCH transmission.

In distributed transmission, the EPDCCH is mapped to resource elements in up to D PRB pairs, where D=2, 4, or 8. In this way, frequency diversity can be achieved for the EPDCCH message. See FIG. 5 for an illustration of the concept of distributed transmission.

In localized transmission, an EPDCCH is mapped to one or two PRB pairs only. For lower aggregation levels only one pair is used. In case the aggregation level of the EPDCCH is too large to fit the EPDCCH in one pair, the second PRB pair is used as well. See FIG. 6 for an illustration of localized transmission.

To facilitate the mapping of enhanced control channel elements (EECCEs) to physical resources, each PRB pair is divided into 16 enhanced resource element groups (EE-REGs) and each EECCE is further divided into $N_{EREG}^{ECCE}=4$ or $N_{EREG}^{ECCE}=8$ EREGs. For normal cyclic prefix (CP) and normal subframes, $N_{EREG}^{ECCE}=4$ unless some conditions are met as described in 3GPP TS 36.213. For extended CP and in some special subframes for Frame structure 2 (time division duplex (TDD)), $N_{EREG}^{ECCE}=8$ is used. An EPDCCH is consequently mapped to a multiple of four or eight EREGs depending on the aggregation level. Generally, an EPDCCH consists of L ECCEs, where L is the aggregation level. The different values of L supported in LTE are 1, 2, 4, 8, 16, 32 (the exact aggregation level allowed depends on which among the two modes of EPDCCH is chosen and other factors).

The EREG belonging to an EPDCCH resides in either a single PRB pair (as is typical for localized transmission) or a multiple of PRB pairs (as is typical for distributed transmission). The division of a PRB pair into EREGs is illustrated in FIG. 7.

The EPDCCH uses demodulation reference signals (DMRS) for demodulation, shown in FIG. 7. There are 24 resource elements (RE) reserved for DMRS per PRB pair. For distributed EPDCCH, there are two DMRS antenna ports in each PRB pair, for normal cyclic prefix (CP), known as antenna ports 107 and 109. These two ports are used for all distributed EPDCCH messages in the PRB pair and provide two-fold antenna diversity (if the network node chooses to transmit each port from a separate antenna, which is an implementation choice). For localized EPDCCH there are up to four antenna ports 107-110 and each port is used by one EPDCCH message only in that PRB pair.

Port 107 uses 12 REs out of the 24 REs in the PRB pair, while port 109 use the other 12 REs. Hence, the DMRS REs belonging to port 107 and 109 are time and frequency multiplexed in the PRB pair. Port 107 and 108 (and also port 109/110) on the other hand, use the same REs but are code multiplexed by applying an orthogonal cover code (OCC) on top of 4 REs on the same subcarrier. The OCC used for port 107-110 to create orthogonality are shown in the table below (from 3GPP TS 36.211).

| Table 6.10.3A.2-1 from 3GPP TS 36.211: The sequence $\bar{w}_p(i)$ for normal cyclic prefix | |
|---|---|
| Antenna port p | [$\bar{w}_p(0)$ $\bar{w}_p(1)$ $\bar{w}_p(2)$ $\bar{w}_p(3)$] |
| 107 | [+1 +1 +1 +1] |
| 108 | [+1 −1 +1 −1] |
| 109 | [+1 +1 +1 +1] |
| 110 | [+1 −1 +1 −1] |

For extended CP, only code multiplexed DMRS is used and the length two OCC for port 107 and 108 are given in the table below, from 3GPP TS 36.211.

| Table 6.10.3A.2-2 from 3GPP TS 36.211: The sequence $\bar{w}_p(i)$ for extended cyclic prefix | |
|---|---|
| Antenna port p | [$\bar{w}_p(0)$ $\bar{w}_p(1)$] |
| 107 | [+1 +1] |
| 108 | [−1 +1] |

When receiving the distributed EPDCCH, the wireless device estimates the channel in each DMRS RE and then it uses the OCC within each subcarrier and the corresponding three subcarriers within the PRB pair to obtain the channel estimate for antenna port 107 and 109 respectively. These channel estimates are then used when demodulating the EPDCCH.

Channel State Information Reference Signal (CSI-RS)

In LTE Release-10, a new channel state information reference signal (CSI-RS) was introduced for estimation of channel state information. The CSI-RS based CSI feedback provides several advantages over the Cell-Specific Reference Signal (CRS) based CSI feedback used in previous releases. First, the CSI-RS is not used for demodulation of the data signal, and thus does not require the same density (i.e., the overhead of the CSI-RS is substantially less). Second, CSI-RS provides a much more flexible means to configure CSI feedback measurements (e.g., which CSI-RS resource to measure on can be configured in a wireless device specific manner).

Two types of CSI-RS are defined in LTE: non-zero power (NZP) CSI-RS and zero power (ZP) CSI-RS. NZP CSI-RS is transmitted by a network node (or eNB) for wireless devices to estimate the downlink channels to the network node. For ZP CSI-RS, one or more CSI-RS resources are allocated by the network node but nothing is transmitted on the resources. ZP CSI-RS can be used to reduce interferences to neighbour cells so that better channel estimation can be performed by the wireless devices in the neighbour cells.

For a Rel-13 wireless device, the number of supported antenna ports are 1, 2, 4, 8, 12 and 16. In Rel-14, the antenna port numbers have been increased to include 20, 24, 28 and 32 ports. FIG. 8 shows the REs available for CSI-RS allocations in a PRB. Up to 40 REs can be configured for CSI-RS. CSI-RS is transmitted over all PRBs. Note that CSI-RS signals are transmitted in all RBs of a system bandwidth, so the same resource allocation is repeated in all RBs. In Rel-14 LTE, CSI-RS can also be transmitted with reduced density. That is, the CSI-RS signals corresponding to different ports are transmitted in every $N^{th}$ PRB.

CSI-RSs can be transmitted periodically on certain subframes, also referred to as CSI-RS subframes. A CSI-RS subframe configuration consists of a subframe periodicity and a subframe offset. The periodicity is configurable at 5, 10, 20, 40 and 80 ms. A CSI-RS configuration consists of a CSI-RS resource configuration as specified in Table 6.10.5.2-1 of 3GPP TS36.211 and a CSI-RS subframe configuration as specified in Table 6.10.5.3-1 of 3GPP TS36.211.

Codebook Based Channel State Information (CSI) Estimation and Feedback

In closed loop multiple-input and multiple-output (MIMO) transmission schemes such as TM9 and TM10, a wireless device estimates and feeds back the downlink CSI to the eNB. The evolved node B (eNB) base station uses the feedback CSI to transmit downlink data to the WD. The CSI consists of a transmission rank indicator (RI), a precoding matrix indicator (PMI) and a channel quality indicator(s) (CQI). A codebook of precoding matrices is used by the wireless device to find the best match between the estimated downlink channel and a precoding matrix in the codebook based on certain criteria, for example, the wireless device throughput. The channel is estimated based on a Non-Zero Power CSI reference signal (NZP CSI-RS) transmitted in the downlink for TM9 and TM10.

The CQI/RI/PMI together provide the downlink channel state to the WD. This is also referred to as implicit CSI feedback since the estimation of the channel $H_n$ is not fed back directly. The CQI/RI/PMI can be wideband (i.e., the whole transmission band) or sub band (i.e., parts of the whole transmission band) depending on which reporting mode is configured.

In LTE Rel-13, two types of CSI reporting were introduced, i.e. Class A and Class B [3GPP TS 36.213 Technical Specification Group Radio Access Network; Evolved Universal Terrestrial Radio Access (E-UTRA); Physical layer procedures (Release 13); V13.0.1 (2016-01)]. In Class A CSI reporting, a wireless device measures and reports CSI based on a new codebook for the configured 1-Dimensional or 2-Dimensional antenna array with 8, 12 or 16 antenna ports. The CSI consists of a rank indicator (RI), a PMI and a CQI or CQIs, similar to the CSI reporting in pre Rel-13. The Class A CSI reporting is extended to 20, 24, 28 and 32 ports in LTE Rel-14.

In Class B CSI reporting, in one scenario (referred to as "Class B K>1"), multiple (i.e., K>1) CSI-RS resources can be configured for a wireless device in a single CSI process. Each resource may be for multiple antenna ports (i.e. 1, 2, 4, or 8 ports). Each CSI-RS resource may be associated with a precoded CSI-RS signal. A wireless device measures downlink CSIs associated with all the CSI-RS resources and selects the best CSI among all the CSIs. The wireless device then reports back the selected CSI-RS Resource Indicator (CRI) and the corresponding CSI. In another scenario (also referred to as "Class B K=1"), a wireless device is configured with one CSI-RS resource, and the CSI-RS signals may be precoded or "beamformed" particularly for the wireless device based on some prior information about the wireless device such as uplink (UL) measurements. The wireless device then measures the downlink channel based on the received CSI-RS signals on the CSI-RS resource and feeds back the estimated CSI to the eNB based on a new codebook for 2, 4 or 8 ports.

CSI Process

In LTE Release 11, the concept of a CSI process was introduced such that each CSI process is associated with a NZP CSI-RS resource and a CSI-interference measurement (IM) resource. A CSI-IM resource is defined by a ZP CSI-RS resource and a ZP CSI-RS subframe configuration. A wireless device in TM10 can be configured with one or more (up to four) CSI processes per serving cell by higher layers and each CSI reported by the wireless device corresponds to a CSI process. Multiple CSI processes were introduced to support Coordinated Multi-Point (CoMP) transmission in which a wireless device measures and feeds back CSI associated with each transmission point (TP) to an eNB. Based on the received CSIs, the eNB may decide to transmit data to the wireless device from one of the TPs.

CSI Reporting

For CSI reporting, both periodic and aperiodic (i.e. triggered by eNB) reports are supported, known as P-CSI and A-CSI respectively. In a CSI process, a set of CSI-RS ports are configured for which the wireless device performs measurements. These CSI-RS ports can be configured to be periodically transmitted with 5 ms, 10 ms, 20 ms, etc., periodicity.

LTE Mechanisms for Control Signalling

LTE control signalling can be carried in a variety of ways, including carrying control information on the PDCCH or the PUCCH, embedded in the PUSCH, in medium access control (MAC) control elements ('MAC CEs'), or in radio resource control (RRC) signalling. Each of these mechanisms is customized to carry a particular kind of control information.

Control information carried on the PDCCH, the PUCCH, or embedded in the PUSCH is physical layer related control information, such as downlink control information (DCI), and uplink control information (UCI), as described in 3GPP TS 36.211, 36.212, and 36.213. DCI is generally used to instruct the wireless device to perform some physical layer function, providing the needed information to perform the function. UCI generally provides the network with needed information, such as hybrid automatic repeat request acknowledgement (HARQ-ACK), scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321 [3GPP TS 36.321 Technical Specification Group Radio Access Network; Evolved Universal Terrestrial Radio Access (E-UTRA); Medium Access Control (MAC) protocol specification (Release 13); V13.2.0 (2016-06)]. Since a MAC header does not have a fixed size, control information in MAC CEs can be sent when it is needed, and does not necessarily represent a fixed overhead. Furthermore, MAC CEs can carry larger control payloads efficiently, since they are carried in UL-shared channel (SCH) or DL-SCH transport channels, which benefit from link adaptation, HARQ, and can be turbo coded (whereas UCI and DCI can't be in Rel-13). MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and contention resolution identity (CRI) are not carried in MAC CEs in Rel-13.

Rate Matching

In LTE, a virtual circular buffer is used to match any available code rate by selecting or pruning bits in the buffer. This rate matching is useful since the number of available REs for a wireless device in a subframe may vary due to the presence or absence of various reference signals. For example, the number of REs for the PDSCH in a subframe configured with CSI-RSs would be different from that in subframes without CSI-RSs. The rate matching can be used to adapt the variations of the available PDSCH REs in this case. Note that in this case, both the eNB and the wireless device knows the exact number of available PDSCH REs and the RE locations in a RB. This PDSCH to RE mapping information is important for correct PDSCH decoding as otherwise, there could be a mismatch between the REs a PDSCH is transmitted on and the REs over which the PDSCH is received and decoded.

PQI Bits in DCI 2D

In LTE Rel-11, a wireless device configured in transmission mode 10 for a given serving cell can be configured with up to four parameter sets by higher layer signalling to decode the PDSCH according to a detected PDCCH/EPDCCH with DCI format 2D intended for the wireless device and the given serving cell. This is because the eNB may transmit the PDSCH to the wireless device via different transmission points (TPs) at different times based on the channel conditions. There can be different reference signals configured for different TPs. The wireless device shall use the parameter set according to the value of the 'PDSCH RE Mapping and Quasi-Co-Location indicator' (PQI) field (defined in Table 1, which is extracted from Table 7.1.9-1 in TS 36.213) in the detected PDCCH/EPDCCH with DCI format 2D for determining the correct PDSCH RE mapping. Dynamic point selection (DPS) is a form of coordinated multi-point operation (CoMP) where the data transmission is from a single TP, where the TP that transmits in a given time can change dynamically.

To support CoMP with DPS where the wireless device can receive the PDSCH, two 'PQI' bits in DCI format 2D are available for dynamic signalling of the PDSCH mapping and quasi-co-location (QCL) information. This dynamic signalling targets adjusting transmission parameters and wireless device QCL assumptions so that they are compatible with the potentially dynamically changing TP from which the PDSCH transmission in DPS originates. The QCL information provides the possibility for a wireless device to exploit CRS and CSI-RS for, in terms of QCL properties, aiding its demodulation of DMRS based PDSCH transmission. QCL properties make clear which properties of the channel may be assumed by the wireless device to be related between different antenna ports and are for TM10.

The parameters for determining PDSCH RE mapping are configured via higher layer signalling for each parameter set, including
Number of CRS ports
CRS FreqShift.
ZP CSI-RS configuration

TABLE 1

PDSCH RE Mapping and Quasi-Co-Location Indicator field in DCI format 2D

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Puncturing

Puncturing can be another way of dealing with the variations of the available REs when a wireless device is unaware of the presence of certain reference signals in a subframe. For example, CSI-RS was introduced in LTE Rel-10 and a Rel-8 wireless device does not understand it. So, if a Rel-8 wireless device is scheduled, the PDSCH in a subframe configured with CSI-RS, the wireless device would think that the PDSCH is transmitted on the REs that are actually configured with CSI-RS. In this case, the eNB mutes the PDSCH transmission in those REs, or 'punctures' the PDSCH signals in the REs, and the wireless device treats the received CSI-RS as the PDSCH. Of course, the decoding performance would be degraded. However, as long as the number of REs are small, the degradation can still be acceptable.

Aperiodic CSI-RS

In LTE Rel-14, it has been agreed [Chairman's notes, 3GPP RAN1#86, section 7.2.4.1.2, Aug. 22-26, 2016. Gothenburg, Sweden] that aperiodic CSI-RS will be introduced, in which only CSI-RS resources are configured for a wireless device and unlike in the conventional CSI-RS configuration, there is no subframe configuration associated with it. It was agreed that a new "Aperiodic CSI-RS-Resource-Config IE" will be defined in the Radio Resource Control (RRC) configuration. It was further agreed that a wireless device can be preconfigured with K={1, 2, . . . , 8} CSI-RS resources.

One of the motivations for aperiodic CSI-RS is that the transmission of CSI-RSs can occur in any subframe in order for a wireless device to measure and feedback downlink CSI, and it does not have to be limited to a set of preconfigured subframes. Another motivation is to be able to reduce CSI-RS overhead in the presence of a large number of wireless devices. For instance, if a large number of wireless devices are present, allocated periodic CSI-RS resources to each wireless device in a WD-specific manner will consume a large number of REs and will drive the CSI-RS overhead up. The CSI-RS overhead can be reduced by aperiodic CSI-RS with a pool of CSI-RS resources where the pool can contain a maximum of K resources. The CSI-RS resource pool containing multiple CSI-RS resources can be shared among a group of wireless devices in which precoded or beamformed CSI-RS for targeting different wireless devices can be transmitted at different subframes by sharing the common CSI-RS resource pool. The presence of aperiodic CSI-RS and CSI measurement request can be dynamically triggered in DCI such as an uplink data grant message sent on the PDCCH or the EPDCCH to the targeted wireless devices for CSI measurement and report. An example is shown in FIG. 9. In the dynamic aperiodic CSI-RS indication, the wireless device is told to measure CSI in the subframe it receives the indication and on which one of the preconfigured CSI-RS resources it should measure CSI. The wireless device measures CSI on the indicated CSI-RS resource and feeds back the CSI to the base station.

In some cases, not all K preconfigured CSI-RS resources may be needed if the load is varying. In this case a number N<K of CSI-RS resources may be activated in a more dynamic way to cope with the varying load in the system. If N among the K CSI-RS resources are activated in the WD, the wireless device can expect to receive aperiodic CSI-RSs in one of the N activated CSI-RS resources. The activation of N out of K resources can be done via MAC CE signalling.

One issue with this aperiodic CSI-RS transmission is potential collision between REs used for the EPDCCH and the REs used for aperiodic CSI-RS transmission. As described above, the presence of aperiodic CSI-RS is dynamically triggered through DCI via an uplink grant message that could be sent on either the PDCCH or the EPDCCH. When possible, indicating the presence of aperiodic CSI-RS dynamically via the EPDCCH (as opposed to indicating via the PDCCH) is desirable as it helps exploit the additional advantages provided by the EPDCCH over the PDCCH. However, the wireless device should first decode the EPDCCH in a subframe before it can know that the aperiodic CSI-RS is transmitted in that subframe or not. This creates a potential collision issue between the REs used for the EPDCCH (similar to the ones shown in FIG. 7) and the REs for aperiodic CSI-RS (chosen from the REs shown in FIG. 8) in case aperiodic CSI-RS transmission in a subframe is indicated by the EPDCCH.

One way to resolve the collision issue is by puncturing the EPDCCH REs when aperiodic CSI-RS is transmitted. A major drawback with this approach is that the number of REs used for aperiodic CSI-RS depends on the load conditions and the number of active wireless devices. Under high load conditions where aperiodic CSI-RS gives the most gains over periodic CSI-RS, the number of REs used for aperiodic CSI-RS could be high. If the EPDCCH is punctured on a large number of REs, the performance of the EPDCCH will be significantly degraded.

A second way to solve the collision issue is by specific configuration of a ZP CSI-RS for the EPDCCH, where the ZP CSI-RS configuration covers the REs that could potentially be used for aperiodic CSI-RS transmission. When the wireless device decodes the EPDCCH, the wireless device assumes that the EPDCCH is either rate matched around, or punctured on, the REs contained in the ZP CSI-RS specifically configured for the EPDCCH. A drawback with this approach is that an additional ZP CSI-RS configuration (that is specifically used for rate matching or puncturing purposes with the EPDCCH) need to be signalled to the WD. Additionally, if the EPDCCH indicates that an aperiodic CSI-RS transmission is present in the subframe then REs covered by the EPDCCH-specific ZP CSI-RS configuration can also contain aperiodic CSI-RS. This complicates the wireless device processing as it is generally desirable to indicate to the wireless device a ZP CSI-RS configuration that it uses to rate match all channels (including the EPDCCH and the PDSCH).

SUMMARY

In some embodiments, a method in a wireless device is provided. The method includes receiving the aperiodic CSI-RS based on the assumption that the aperiodic CSI-RS is not present in physical layer resources contained within the downlink control channel set. The method may also include receiving signalling to configure the wireless device with a downlink control channel set. The method may also include receiving from the network node on a physical control channel an indication of a presence of the aperiodic CSI-RS in a subframe.

In some embodiments, the indication of a presence of the aperiodic CSI-RS indicates that the aperiodic CSI-RS is present in one of a subframe or a slot. In some embodiments, the indication of a presence of the aperiodic CSI-RS indicates that the aperiodic CSI-RS is present in a predetermined number of OFDM symbols.

In some embodiments, the aperiodic CSI-RS can be transmitted in the physical layer resources in at least some defined conditions.

In some embodiments, the wireless device assumes that the aperiodic CSI-RS is not transmitted in a subframe in physical resource blocks, PRBs, corresponding to the downlink control channel set with which the wireless device is configured if the wireless device receives a downlink control channel message in the subframe that indicates that an aperiodic CSI-RS has been transmitted in the downlink control channel set. In some embodiments, if a presence of the aperiodic CSI-RS in a subframe is indicated by a downlink control channel, such as PDCCH, and the wireless device does not receive a downlink control channel message in the downlink control channel set, then the wireless device assumes that aperiodic CSI-RS is transmitted in the subframe in the physical resource blocks, PRBs, corresponding to the downlink control channel set. In some embodiments, a presence of the aperiodic CSI-RS in a subframe is indicated to the wireless device via a downlink control channel, such as PDCCH, and if the wireless device does not receive a downlink control channel message that indicates that the aperiodic CSI-RS has been transmitted in the downlink control channel set, then the wireless device assumes that the aperiodic CSI-RS is contained in the physical resource blocks, PRBs, corresponding to the downlink control channel set in the subframe. In some embodiments, the wireless device assumes that the aperiodic CSI-RS is not transmitted in a subframe in the physical resource blocks, PRBs, corresponding to the downlink control channel set with which the wireless device is configured regardless of whether a downlink control channel message is received in the downlink control channel set.

In some embodiments, the wireless device assumes that the aperiodic CSI-RS is not transmitted in a subframe of physical resource blocks, PRBs, carrying a downlink control channel message to the wireless device if the wireless device receives a downlink control message in the subframe that indicates that the aperiodic CSI-RS has been transmitted. In some embodiments, if a presence of the aperiodic CSI-RS in a subframe is indicated by a downlink control channel, such as PDCCH, and the wireless device does not receive a downlink control channel message, then the wireless device assumes the aperiodic CSI-RS is transmitted in the subframe in the physical resource blocks, PRBs, corresponding to the downlink control channel set with which the wireless device is configured. In some embodiments, the wireless device assumes that a network node does not transmit aperiodic CSI-RS in the physical resource blocks, PRBs, carrying a downlink control channel message to that wireless device if the wireless device receives a downlink control channel message that indicates that a aperiodic CSI-RS has been transmitted in the subframe. In some embodiments, if a presence of the aperiodic CSI-RS in a subframe is indicated to the wireless device via a downlink control channel, such as PDCCH, and if the wireless device does not receive a downlink control channel message, then the wireless device assumes that aperiodic CSI-RS is transmitted to the wireless device in the physical resource blocks, PRBs, corresponding to the downlink control channel set with which the wireless device is configured in the subframe.

In some embodiments, the wireless device assumes that the aperiodic CSI-RS is not transmitted in a subframe in any resource elements, REs, carrying a downlink control channel message to the wireless device if the wireless device receives a downlink control channel message in the subframe. In some embodiments, if a presence of the aperiodic CSI-RS in a subframe is indicated by a downlink control channel, such as PDCCH, and the wireless device does not receive a downlink control channel message, then the wireless device assumes that the aperiodic CSI-RS can be transmitted in the subframe in all resource elements, REs, corresponding to the downlink control channel set with which the wireless device is configured. In some embodiments, the wireless device assumes that aperiodic CSI-RS are not transmitted in a downlink pilot time slot in a case of frame structure type 2. In some embodiments, the wireless device assumes that aperiodic CSI-RS are not transmitted in subframes where transmission of the aperiodic CSI-RS would collide with a SystemInformationBlockType1 message. In some embodiments, the wireless device assumes that aperiodic CSI-RS are not transmitted in physical resource block pairs corresponding to the downlink control channel set with which the wireless device is configured in the subframe.

In some embodiments, the wireless device assumes that aperiodic CSI-RS are not transmitted in physical resource block pairs carrying the downlink control channel associated with a trigger of the aperiodic CSI-RS using an aperiodic trigger. In some embodiments, the wireless device assumes that aperiodic CSI-RS are not transmitted in any resource elements, RE, carrying the downlink control channel associated with a trigger of the aperiodic CSI-RS using an aperiodic trigger. In some embodiments, the downlink control channel is an enhanced physical downlink control channel, EPDCCH, and a downlink control channel message is an EPDCCH message in a long term evolution communication system.

In some embodiments, a wireless device is provided. The wireless device includes processing circuitry configured to receive the aperiodic CSI-RS based on the assumption that the aperiodic CSI-RS is not present in physical layer resources contained within the downlink control channel set. The processing circuitry may be further configured to receive signalling from a network node to configure the wireless device with the downlink control channel set and/or to receive from the network node on a physical control channel an indication of a presence of the aperiodic CSI-RS. The transceiver is further configured to In some embodiments, the wireless device assumes that the aperiodic CSI-RS is not transmitted in a subframe in physical resource blocks, PRBs, corresponding to the downlink control channel set with which the wireless device is configured if the wireless device receives a downlink control channel message in the subframe that indicates that an aperiodic CSI-RS has been transmitted in the downlink control channel set. In some embodiments, if a presence of the aperiodic CSI-RS in a subframe is indicated by a downlink control channel, such as PDCCH, and the wireless device does not receive a downlink control channel message in the downlink control channel set, then the wireless device assumes that aperiodic aperiodic CSI-RS is transmitted in the subframe in the physical resource blocks, PRBs, corresponding to the downlink control channel set. In some embodiments, if a presence of the aperiodic CSI-RS in a subframe is indicated to the wireless device via a downlink control channel, such as PDCCH, and if the wireless device does not receive a downlink control channel message that indicates that the aperiodic CSI-RS has been transmitted in the downlink control channel set, then the wireless device assumes that the aperiodic CSI-RS is contained in the physical resource blocks, PRBs, corresponding to the downlink control channel set in the subframe.

In some embodiments, the wireless device assumes that aperiodic aperiodic CSI-RS is not transmitted in a subframe in the physical resource blocks, PRBs, corresponding to the downlink control channel set with which the wireless device is configured regardless of whether a downlink control channel message is received in the downlink control channel set. In some embodiments, the wireless device assumes that the aperiodic CSI-RS is not transmitted in a subframe of physical resource blocks, PRBs, carrying a downlink control channel message to the wireless device if the wireless device receives a downlink control message in the subframe that indicates that the aperiodic CSI-RS has been transmitted. In some embodiments, if a presence of the aperiodic CSI-RS in a subframe is indicated by a downlink control channel, such as PDCCH, and the wireless device does not receive a downlink control channel message, then the wireless device assumes the aperiodic CSI-RS is transmitted in the subframe in the physical resource blocks, PRBs, corresponding to the downlink control channel set with which the wireless device is configured.

In some embodiments, the wireless device assumes that a network node does not transmit aperiodic CSI-RS in the physical resource blocks, PRBs, carrying a downlink control channel message to that wireless device if the wireless device receives a downlink control channel message that indicates that a aperiodic CSI-RS has been transmitted in the subframe. In some embodiments, if a presence of the aperiodic CSI-RS in a subframe is indicated to the wireless device via a downlink control channel, such as PDCCH, and if the wireless device does not receive a downlink control channel message, then the wireless device assumes that aperiodic CSI-RS is transmitted to the wireless device in the physical resource blocks, PRBs, corresponding to the downlink control channel set with which the wireless device is configured in the subframe. In some embodiments, the wireless device assumes that the aperiodic CSI-RS is not transmitted in a subframe in any resource elements, REs, carrying a downlink control channel message to the wireless device if the wireless device receives a downlink control channel message in the subframe. In some embodiments, if a presence of the aperiodic CSI-RS in a subframe is indicated by a downlink control channel, such as PDCCH, and the wireless device does not receive a downlink control channel message, then the wireless device assumes that the aperiodic CSI-RS can be transmitted in the subframe in all resource elements, REs, corresponding to the downlink control channel set with which the wireless device is configured.

In some embodiments, the wireless device assumes that aperiodic CSI-RS are not transmitted in a downlink pilot time slot in a case of frame structure type 2. In some embodiments, the wireless device assumes that aperiodic CSI-RS are not transmitted in subframes where transmission of the aperiodic CSI-RS would collide with a SystemInformationBlockType1 message. In some embodiments, the wireless device assumes that aperiodic CSI-RS are not transmitted in physical resource block pairs corresponding to the downlink control channel set with which the wireless device is configured in the subframe. In some embodiments, the wireless device assumes that aperiodic CSI-RS are not transmitted in physical resource block pairs carrying the downlink control channel associated with a trigger of the aperiodic CSI-RS using an aperiodic trigger. In some embodiments, the wireless device assumes that aperiodic CSI-RS are not transmitted in any resource elements, RE, carrying the downlink control channel associated with a trigger of the aperiodic CSI-RS using an aperiodic trigger. In some embodiments, the downlink control channel is an enhanced physical downlink control channel, EPDCCH, and a downlink control channel message is an EPDCCH message in a long term evolution communication system.

In some embodiments, a wireless device configured to avoid collision between downlink control channel and a channel state information reference signal, aperiodic CSI-RS, is provided. The wireless device includes a downlink control channel set configuration receiver module configured to receive signalling from a network node to configure the wireless device with a downlink control channel set. The wireless device also includes a downlink control channel set configuration module configured to configure the wireless device with a downlink control channel set according to signalling received from a network node. The wireless device further includes a aperiodic CSI-RS indication receiver module configured to receive from the network node on a physical control channel an indication of a presence of the aperiodic CSI-RS in a subframe. The wireless device also includes a aperiodic CSI-RS receiver module configured to receive the aperiodic CSI-RS based on the assumption that the aperiodic CSI-RS is not present in physical layer resources contained within the downlink control channel set.

In some embodiments, a method in a network node is provided. The method includes signalling a wireless device to configure the wireless device with a downlink control channel set that does not contain a aperiodic CSI-RS. The method also includes signalling to the wireless device a aperiodic CSI-RS, the presence of the aperiodic CSI-RS in a downlink channel so as to enable the wireless device to assume that the aperiodic CSI-RS is not present in physical layer resources contained within the downlink control channel set.

In some embodiments, the network node does not transmit the aperiodic CSI-RS to the wireless device in a subframe in the physical resource blocks, PRBs, corresponding to the downlink control channel set configured to the wireless device. In some embodiments, the network node indicates a presence of the aperiodic CSI-RS in the subframe and the wireless device does not assume that the aperiodic CSI-RS is not present in the downlink control channel set. In some embodiments, the network node indicates a presence of the aperiodic CSI-RS in the subframe and transmits the aperiodic CSI-RS in the subframe in all resource elements corresponding to the downlink control channel set.

In some embodiments, a network node is provided. The network node includes processing circuitry configured to signal to a wireless device to configure the wireless device with a downlink control channel set that does not contain a aperiodic CSI-RS. The transceiver is configured to signal to the wireless device a aperiodic CSI-RS, the presence of the aperiodic CSI-RS in a downlink channel so as to enable the wireless device to assume that the aperiodic CSI-RS is not present in physical layer resources contained within the downlink control channel set.

In some embodiments, the network node does not transmit the aperiodic CSI-RS to the wireless device in a subframe in the physical resource blocks, PRBs, corresponding to the downlink control channel set configured to the wireless device. In some embodiments, the network node indicates a presence of the aperiodic CSI-RS in the subframe and the wireless device does not assume that the aperiodic CSI-RS is not present in the downlink control channel set. In some embodiments, the network node indicates a presence of the aperiodic CSI-RS in the subframe and transmits the aperiodic CSI-RS in the subframe in all resource elements corresponding to the downlink control channel set.

In some embodiments, a network node is provided. The network node includes a transceiver module configured to signal to a wireless device to configure the wireless device with a downlink control channel set that does not contain a aperiodic CSI-RS. The transceiver module is also configured to signal to the wireless device a aperiodic CSI-RS, the presence of the aperiodic CSI-RS being in a subframe in a downlink channel so as to enable the wireless device to assume that the aperiodic CSI-RS is not present in physical layer resources contained within the downlink control channel set.

In some embodiments, the indication of a presence of the aperiodic CSI-RS indicates that the aperiodic CSI-RS is present in one of a subframe or a slot. In some embodiments, the indication of a presence of the aperiodic CSI-RS indicates that the aperiodic CSI-RS is present in a predetermined number of OFDM symbols.

In some embodiments, the aperiodic CSI-RS can be transmitted in the physical layer resources in at least some defined conditions.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
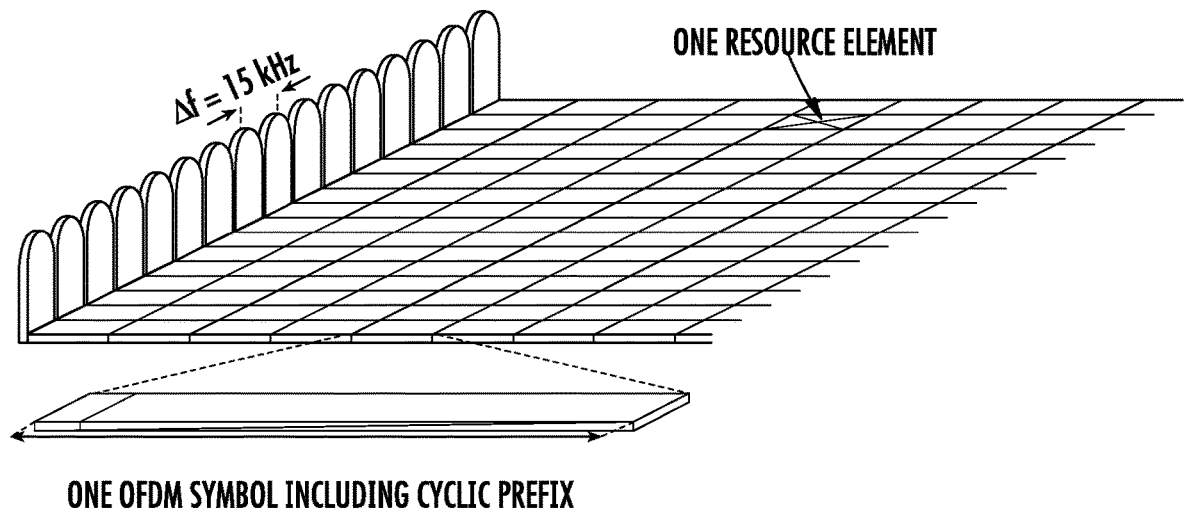
FIG. 1 is a schematic diagram illustrating a LTE downlink physical resource.
Figure 2:
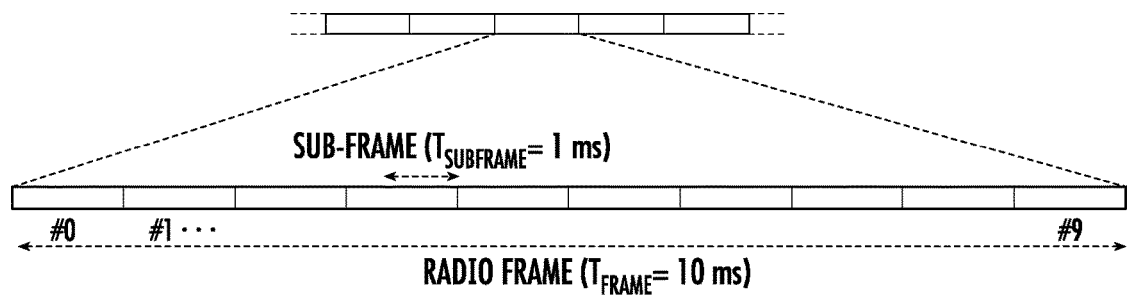
FIG. 2 is a schematic diagram illustrating a LTE time-domain structure.
Figure 3:
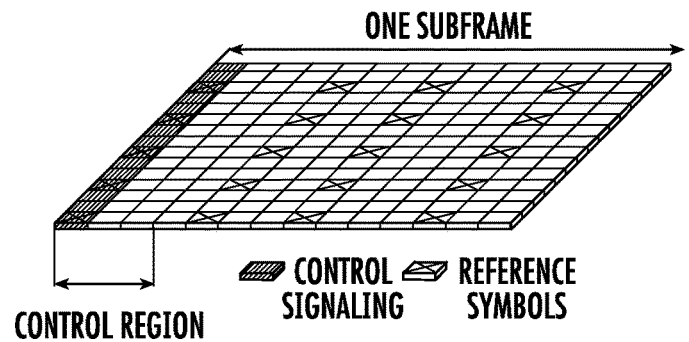
FIG. 3 is a schematic diagram illustrating a downlink subframe.
Figure 4:
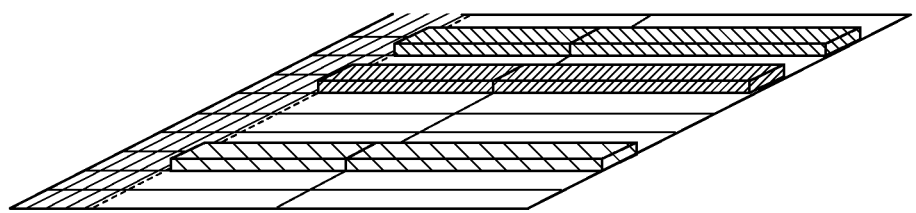
FIG. 4 is a schematic diagram illustrating a downlink subframe showing 10 RB pairs and configuration of three EPDCCH regions of size 1 PRB pair each, the remaining PRB pairs can be used for PDSCH transmissions.
Figure 5:
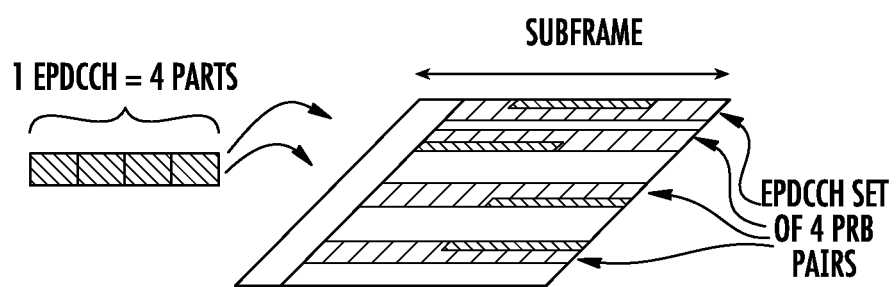
FIG. 5 is a schematic diagram illustrating a downlink subframe showing 4 parts, an enhanced resource element group (EREG), belonging to an EPDCCH being mapped to multiples of the enhanced control regions known as PRB pairs in an EPDCCH set, to achieve distributed transmission and frequency diversity.
Figure 6:
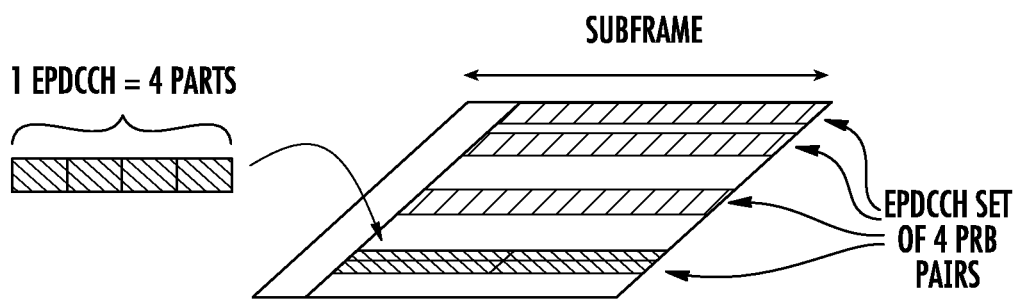
FIG. 6 is a schematic diagram illustrating a downlink subframe showing the 4 ECCEs belonging to an EPDCCH are mapped to one of the enhanced control regions, to achieve localized transmission.

Before describing in detail exemplary embodiments, it is noted that the embodiments reside primarily in combinations of apparatus components and processing steps related to avoiding collision between enhanced physical downlink control channel (EPDCCH) and aperiodic channel state information reference signals (CSI-RS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Note that although terminology from 3GPP LTE has been used in this disclosure, this should not be seen as limiting the scope of the disclosure to only the aforementioned system. Other wireless systems, including but not limited to Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Also note that terminology such as eNodeB and wireless device should be considering non-limiting and does in particular not imply a certain hierarchical relation between the two; in general "eNodeB" could be considered as a first device and "UE" a second device, and these two devices communicate with each other over some radio channel Herein, we also focus on wireless transmissions in the downlink, but implementation and the functions and concepts described herein are equally applicable in the uplink.

In order to improve aperiodic CSI-RS resource efficiency while at the same time reducing average CSI triggering delay (see R1-167637, "UE specific Beamforming with Aperiodic CSI-RS Transmission", Ericsson, 3GPP TSG-RAN WG1 #86, Gothenburg, Sweden, Aug. 22-26, 2016, for details), the K CSI-RS resources without 'Subframe_config' need to be dynamically shared among multiple wireless devices.

Figure 7:
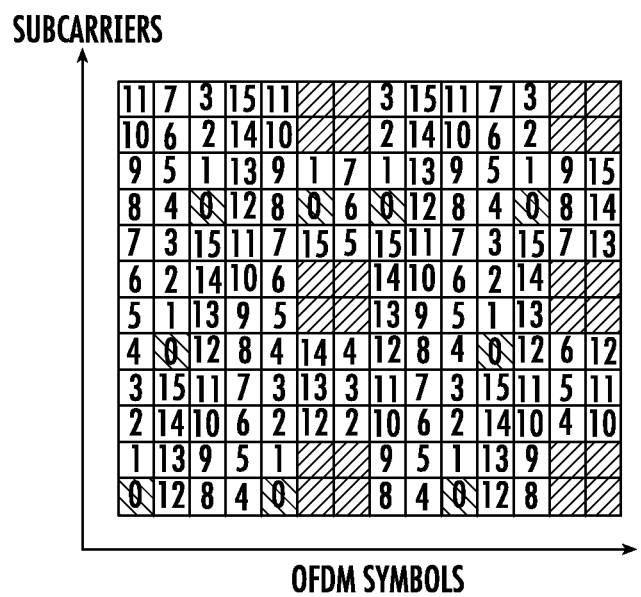
FIG. 7 is a schematic diagram illustrating a PRB pair of normal cyclic prefix configuration in a normal subframe, where the shaded un-numbered squares contain the demodulation reference signals (DMRS); each numbered square being a resource element in which the number corresponds to the EREG it belongs to; the shaded numbered squares corresponding to the RD belonging to the same EREG indexed with 0, etc.
Figure 8:
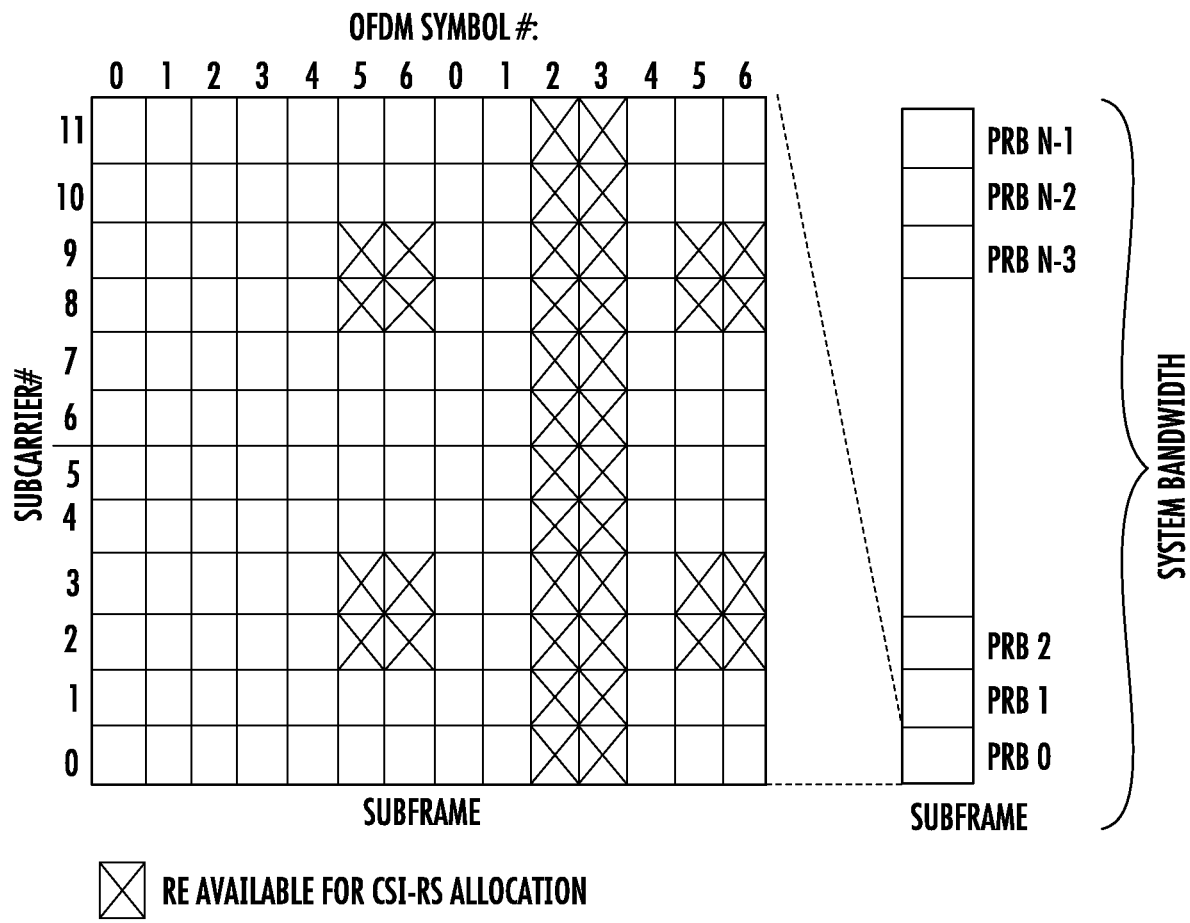
FIG. 8 is a schematic diagram illustrating resources available for CSI-RS allocation in a PRB in a CSI-RS subframe.
Figure 9:
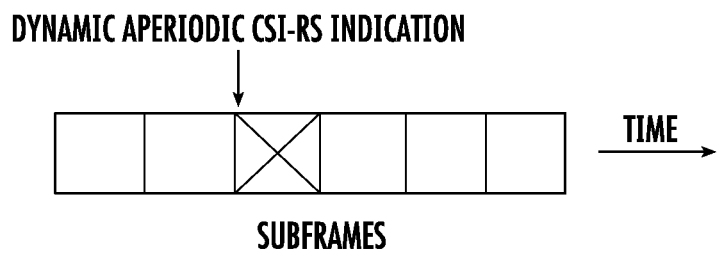
FIG. 9 is a schematic diagram illustrating an aperiodic CSI-RS transmission.

A problem with the introduction of aperiodic CSI-RS transmission is the potential collision between REs used for EPDCCH and the REs used for aperiodic CSI-RS transmission. As described above, the presence of aperiodic CSI-RS is dynamically triggered via DCI via an uplink grant message that could be sent on either the PDCCH or the EPDCCH. When possible, indicating the presence of aperiodic CSI-RS dynamically via the EPDCCH (as opposed to indicating via the PDCCH) is desirable as it helps exploit the additional advantages provided by the EPDCCH over the PDCCH. However, the wireless device should first decode the EPDCCH in a subframe before it can know that the aperiodic CSI-RS is transmitted in that subframe or not. This creates a potential collision problem between the REs used for EPDCCH (similar to the ones shown in FIG. 7) and the REs for aperiodic CSI-RS (chosen from the REs shown in FIG. 8) in case aperiodic CSI-RS transmission in a subframe is indicated by the EPDCCH.

One way to resolve the collision issue is by puncturing the EPDCCH REs when aperiodic CSI-RS is transmitted. A major drawback with this approach is that the number of REs used for aperiodic CSI-RS depends on the load conditions and the number of active wireless devices. Under high load conditions where aperiodic CSI-RS gives the most gains over periodic CSI-RS, the number of REs used for aperiodic CSI-RS could be high. If the EPDCCH is punctured on a large number of REs, the performance of the EPDCCH will be significantly degraded.

A second way to solve the collision issue is by specifically configuring a ZP CSI-RS for the EPDCCH, where the ZP CSI-RS configuration covers the REs that could potentially be used for aperiodic CSI-RS transmission. When the wireless device decodes the EPDCCH, the wireless device assumes that the EPDCCH is either rate matched around or punctured on the REs contained in the ZP CSI-RS specifically configured for EPDCCH. The drawback with this approach is that an additional ZP CSI-RS configuration (that is specifically used for rate matching or puncturing purposes with EPDCCH) needs to be signalled to the WD. Additionally, if the EPDCCH indicates that an aperiodic CSI-RS transmission is present in the subframe, then REs covered by the EPDCCH-specific ZP CSI-RS configuration can also contain aperiodic CSI-RS. This complicates the wireless device processing as it is generally desirable to indicate to the wireless device a ZP CSI-RS configuration that it uses to rate match all channels (including the EPDCCH and the PDSCH).

To alleviate the drawbacks of these existing solutions, the following solutions are proposed herein.

In one solution, to avoid collision between the EPDCCH and aperiodic CSI-RS, the wireless device can assume that aperiodic CSI-RSs are not transmitted in a subframe where the wireless device is monitoring the EPDCCH, within the PRBs belonging to an EPDCCH set or sets configured to the WD, if the wireless device receives an EPDCCH message in any of the configured EPDCCH sets in the subframe. In another variant of the first solution, the wireless device can assume that aperiodic CSI-RS is not transmitted in the PRBs belonging to an EPDCCH set configured to that wireless device in a subframe regardless of whether a valid EPDCCH message is received for that particular wireless device or not in the EPDCCH set and in the subframe. The CSI-RS is still transmitted by the network node in PRBs outside the EPDCCH set configured to the wireless device mentioned above, and the wireless device can therefore make the corresponding CSI measurements on those CSI-RSs outside the mentioned EPDCCH set(s).

Note that an EPDCCH message is valid for the wireless device if the wireless device successfully decodes the message with the C-RNTI (radio network temporary identifier) to which the wireless device has been assigned. The C-RNTI is encoded in the CRC (cyclic redundancy check), and if the CRC fails, the wireless device discards the EPDCCH message, but if the CRC matches the message is intended for the wireless device and the message is valid. The wireless device will in this case take action on the content of the message which may contain the trigger of the aperiodic CSI-RS.

In a second solution, the wireless device can assume that aperiodic CSI-RSs are not transmitted in a subframe, within the PRBs carrying an EPDCCH message to the wireless device if the wireless device receives an EPDCCH message in the subframe that indicates an aperiodic CSI-RS has been transmitted. Particularly, the wireless device thus does not measure CSI-RS in those PRB for which it received the valid EPDCCH message containing the trigger of the aperiodic CSI-RS in the same subframe.

In a third solution, the wireless device can assume that aperiodic CSI-RS is not transmitted in a subframe in any REs carrying an EPDCCH message to the wireless device if the wireless device receives an EPDCCH message in the subframe that indicates an aperiodic CSI-RS has been transmitted. Particularly, the wireless device thus does not measure CSI-RS in those RE for which it received the valid EPDCCH message containing the trigger of the aperiodic CSI-RS in the same subframe.

The main advantages of the proposed solutions are simplified wireless device processing, alleviating the need to signal the wireless device with additional ZP CSI-RS configurations that are specific to EPDCCH only, and maintaining good EPDCCH performance by avoiding puncturing of EPDCCH REs.

Figure 10:
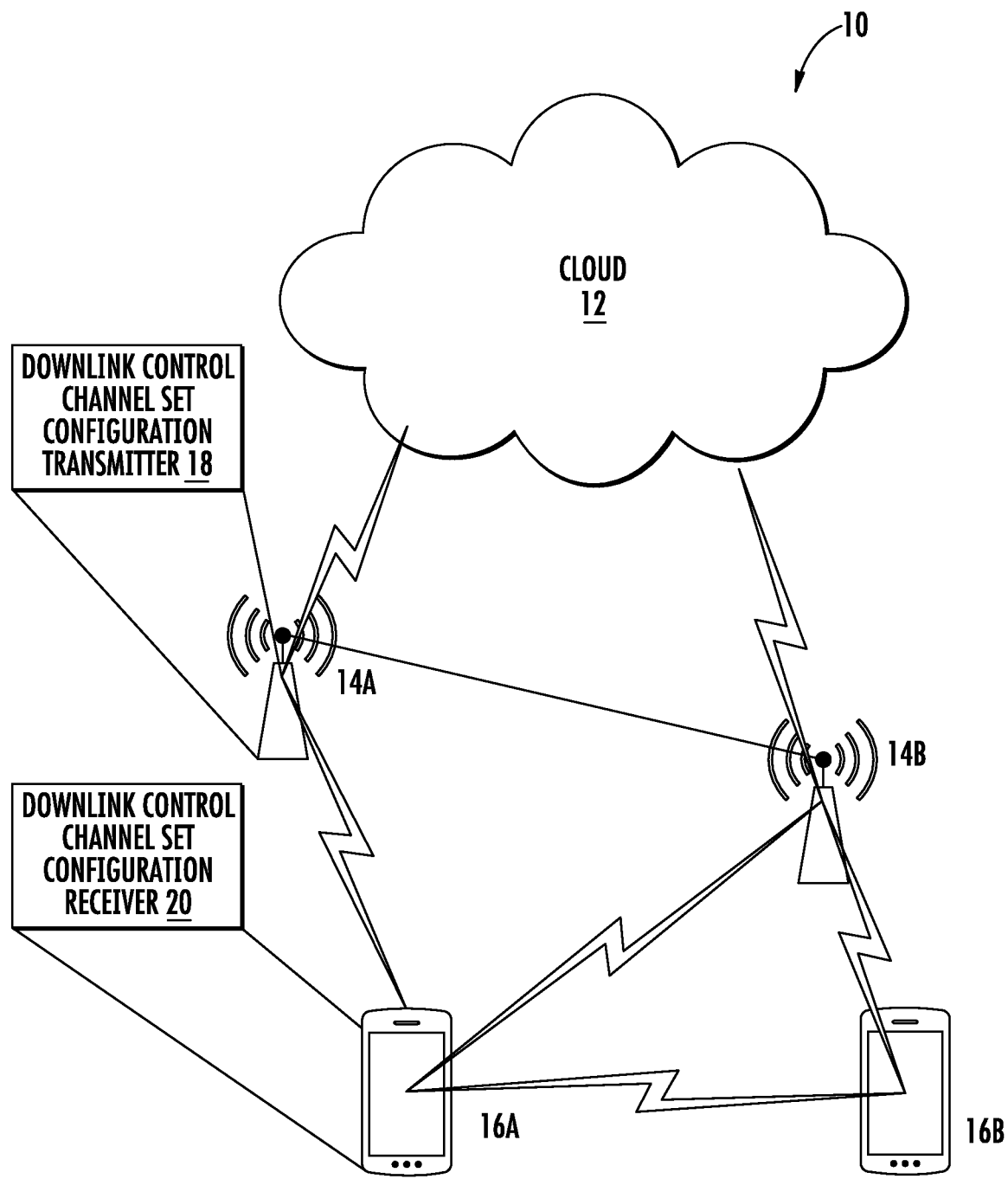
FIG. 10 is a block diagram of a wireless communication system constructed according to principles set forth herein.

Returning to the drawing figures, in which like elements are referred to by like reference numerals, there is shown in FIG. 10 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

As shown in FIG. 10, the network node 14 includes a transmitter 18 configured to transmit a downlink control channel set configuration to a wireless device 16. The wireless device 16 includes a receiver 20 configured to receive the downlink control channel set configuration from the network node 14

Figure 11:
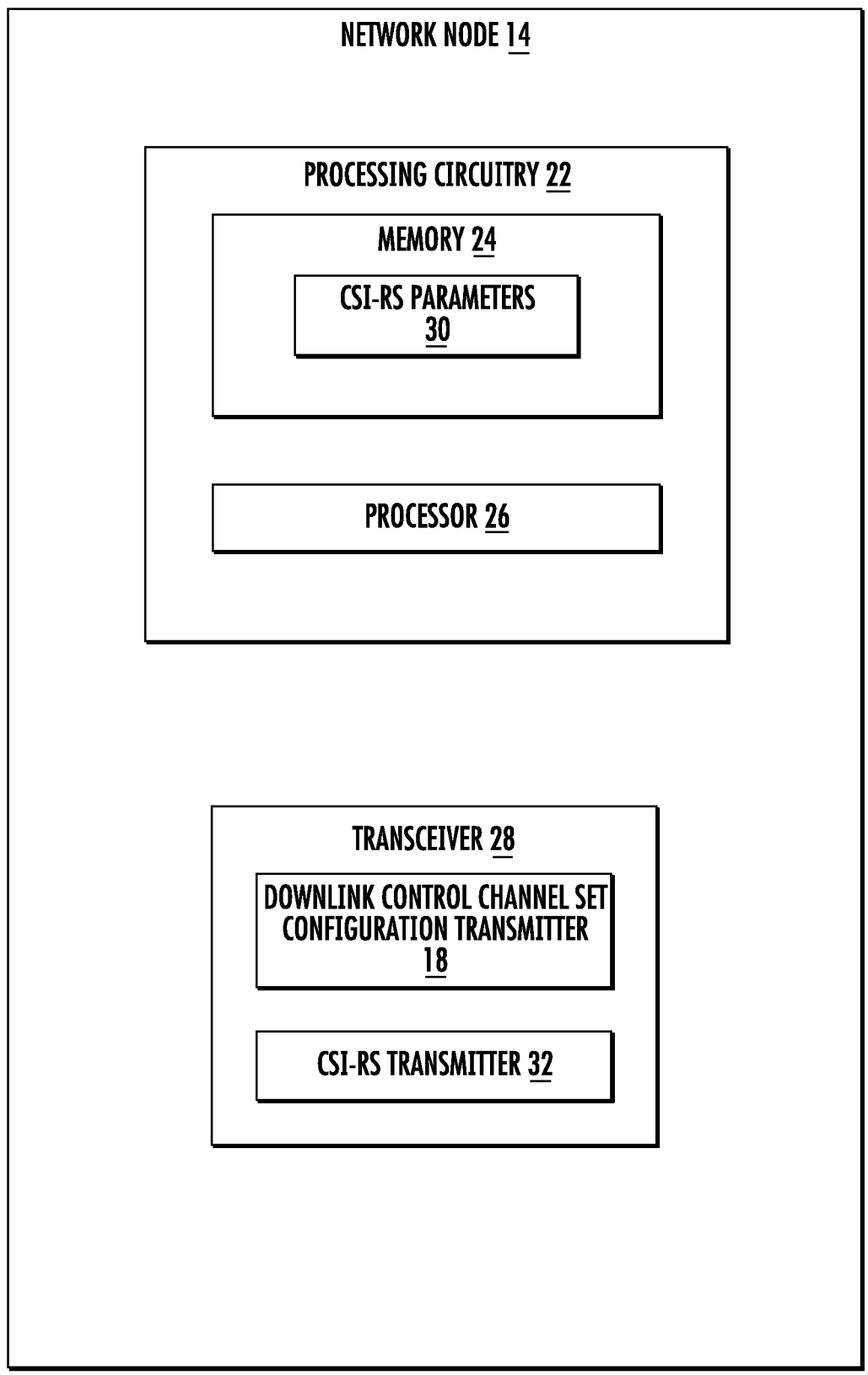
FIG. 11 is a block diagram of a network node constructed according to principles set forth herein.

A block diagram of a network node 14 is shown in FIG. 11. The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store CSI-RS parameters which may include a CSI-RS configuration and/or a CSI-RS subframe configuration, as mentioned above. A transceiver 28 has a downlink control channel set configuration transmitter 18 configured to transmit a downlink control channel set to the wireless device 16 by which the wireless device is to be configured. The transceiver 28 also includes a CSI-RS transmitter 32 (which may be the same transmitter as transmitter 18) configured to transmit a CSI-RS to the wireless device 16, the presence of the CSI-RS being in a subframe in a downlink channel so as to enable the wireless device to assume that the CSI-RS is not present in physical layer resources contained within the downlink control channel set.

Figure 12:
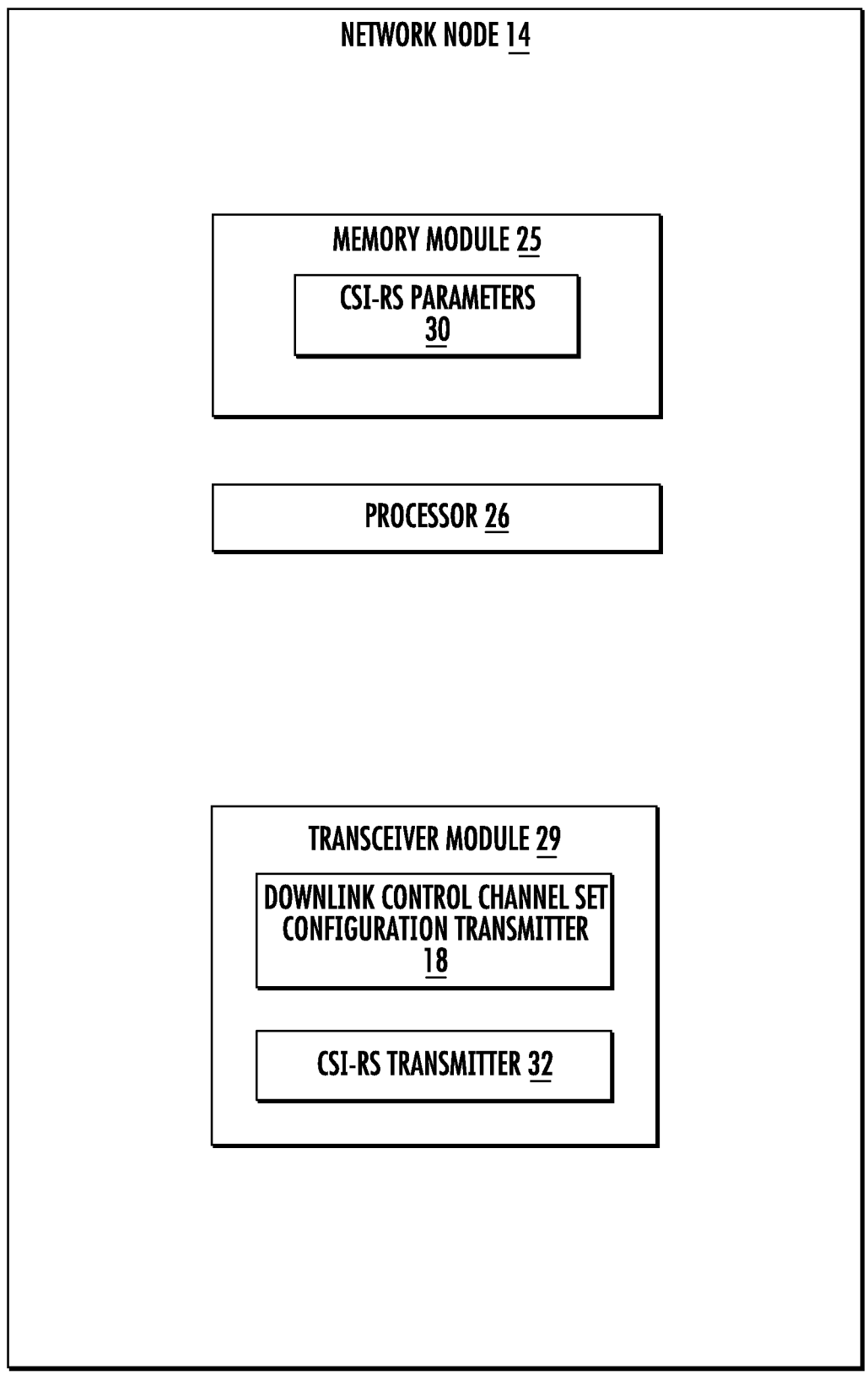
FIG. 12 is a block diagram of an alternative embodiment of a network node constructed according to principles set forth herein.

FIG. 12 is a block diagram of an alternative embodiment of a network node 14 configured according to principles set forth herein for avoiding collision between a downlink control channel and a channel state information reference signal. The network node 14 includes a memory module 25 configured to store CSI-RS parameters. The network node 14 further includes a transceiver module 29 that includes the downlink control channel set configuration transmitter 18 and the CSI-RS transmitter 32. Some functions of the transceiver module 29 may be implemented at least in part by the processor 26.

Figure 13:
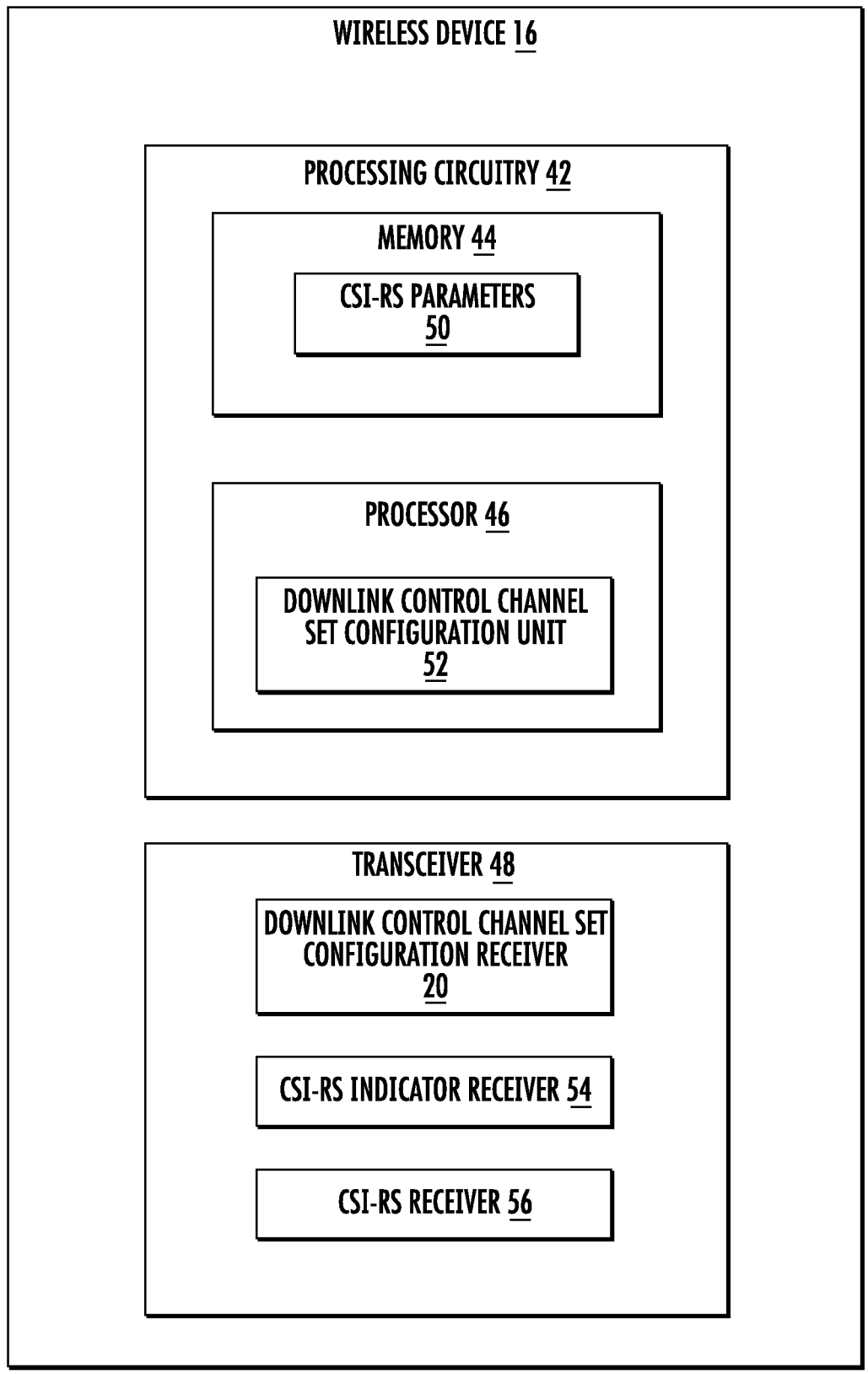
FIG. 13 is a block diagram of a wireless device constructed according to principles set forth herein.

FIG. 13 is a block diagram of a wireless device 16. The wireless device 16 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store CSI-RS parameters which may include a CSI-RS configuration and/or a CSI-RS subframe configuration as mentioned above. The processor 46 is configured to configure the wireless device 16 with a downlink control channel configuration set via a downlink control channel configuration unit 52. A transceiver 48 has a downlink control channel set configuration receiver 20 configured to transmit a downlink control channel set to the wireless device 16 by which the wireless device is to be configured. The transceiver 48 also includes a CSI-RS indicator receiver 54 configured to receive from the network node on a physical control channel an indication of a presence of the CSI-RS in a subframe. The transceiver 48 also includes a CSI-RS receiver 56 (which may be the same receiver as the receiver 20) configured to transmit a CSI-RS to the wireless device 16, the presence of the CSI-RS being in a subframe in a downlink channel so as to enable the wireless device to assume that the CSI-RS is not present in physical layer resources contained within the downlink control channel set.

Figure 14:
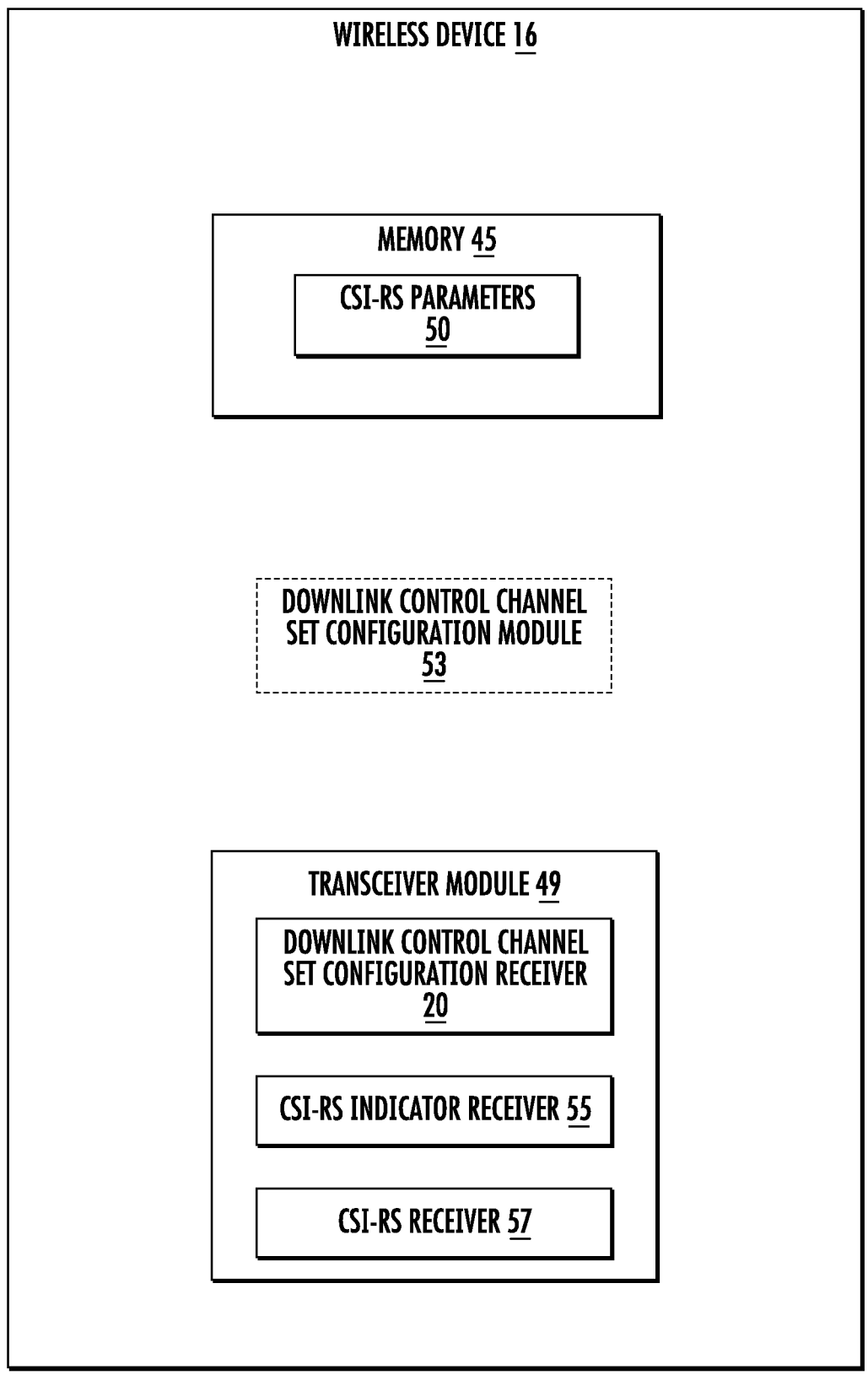
FIG. 14 is a block diagram of an alternative embodiment of a wireless device constructed according to principles set forth herein.

FIG. 14 is a block diagram of an alternative embodiment of a wireless device 16 configured according to principles set forth herein for avoiding collision between a downlink control channel and a channel state information reference signal. The wireless device 16 includes a memory module 45 configured to store CSI-RS parameters. The wireless device 16 also includes a downlink control channel set configuration module 53 that may be implemented as software executable by the processor 46. The wireless device also includes a CSI-RS indication receiver 55 configured to receive from the network node on a physical control channel an indication of a presence of the CSI-RS in a subframe. The wireless device 16 further includes a transceiver module 49 that includes the downlink control channel set configuration receiver 20 and the CSI-RS receiver 57. Some functions of the transceiver module 49 may be implemented at least in part by the processor 46.

Embodiment 1

Figure 15:
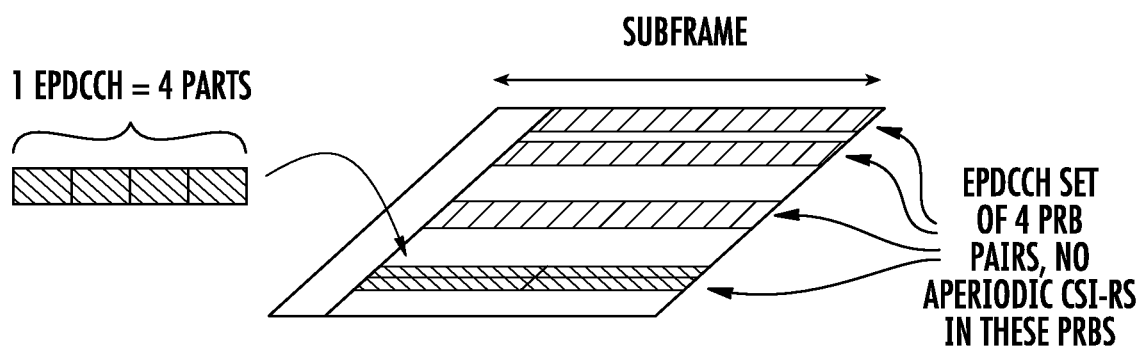
FIG. 15 is an example of an embodiment where the wireless device assumes aperiodic CSI-RS is not transmitted in a given subframe in the PRBs belonging to an EPDCCH set containing EPDCCH message in that subframe.

One solution to resolve the collision between EPDCCH REs and REs belonging to Aperiodic CSI-RS transmission is to let the wireless device assume that aperiodic CSI-RSs are not transmitted in a subframe in the PRBs belonging to an EPDCCH set configured to that wireless device if the wireless device receives an EPDCCH message that indicates that an aperiodic CSI-RS has been transmitted in that EPDCCH set in the subframe. If the presence of aperiodic CSI-RS transmission in a subframe is indicated by the PDCCH and the wireless device does not receive an EPDCCH message in an EPDCCH set, then the wireless device is allowed to assume that aperiodic CSI-RS is transmitted in the subframe in the PRBs belonging to that EPDCCH set. It should be noted that these rules apply only when the wireless device is configured to receive aperiodic CSI-RS which has no subframe configuration associated with it (i.e., the rules do not apply to wireless devices not configured to receive aperiodic CSI-RS transmission). An example of this embodiment is shown in FIG. 15. The steps related to this embodiment are illustrated in FIG. 16.

Figure 16:
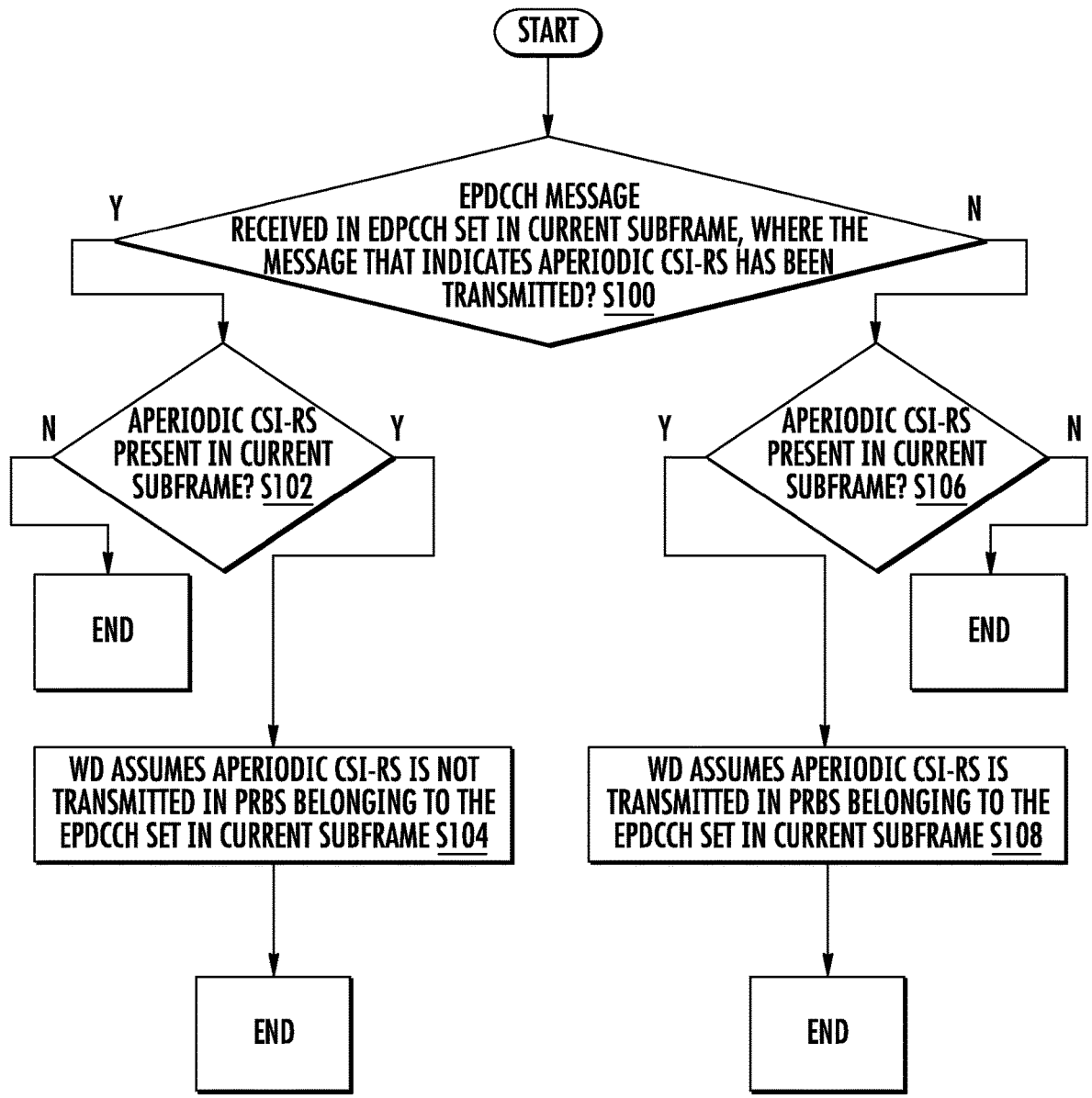
FIG. 16 is flowchart of an exemplary process for determining when an aperiodic CSI-RS is transmitted in PRBs belonging to the EPDCCH set in a current subframe.

FIG. 16 is a flowchart of an exemplary process performed by a wireless device 16 of avoiding collision between a downlink control channel and a channel state information reference signal. The process includes determining whether an EPDCCH message is received, via the receiver 20, in an EPDCCH set in a current subframe, where the message that indicates an aperiodic CSI-RS has been transmitted by the transmitter 32 (block S100). If so, the process includes determining whether an aperiodic CSI-RS is present in the current subframe (block S102). If so, the wireless device 16 assumes an aperiodic CSI-RS is not transmitted in PRBs belonging to the EPDCCH set in the current subframe (block S104). Returning to block S100, if the EPDCCH message is not received in an EPDCCH set in the current subframe indicating that an aperiodic CSI-RS has been transmitted, then a determination is made whether an aperiodic CSI-RS is present in the current subframe (block S106). If so, the wireless device 16 assumes that an aperiodic CSI-RS is transmitted, via the transmitter 32, in PRBs belonging to the EPDCCH set in the current subframe (block S108).

In some variants of the embodiment, the network node 14 does not transmit aperiodic CSI-RS to a wireless device in a subframe in the PRBs belonging to an EPDCCH set configured to that wireless device if the wireless device receives an EPDCCH message in that EPDCCH set in the subframe. If the presence of aperiodic CSI-RS transmission in a subframe is indicated to the wireless device by the network node 14 via the PDCCH and that the wireless device does not receive an EPDCCH message that indicates an aperiodic CSI-RS has been transmitted in an EPDCCH set, then the wireless device may assume that the network node 14 transmits aperiodic CSI-RS to the wireless device in the PRBs belonging to that EPDCCH set in the subframe.

In an alternate embodiment, if a wireless device is configured with EPDCCH sets and is configured to receive aperiodic CSI-RS, then the wireless device can assume that aperiodic CSI-RS is not transmitted in a subframe in the PRBs belonging to an EPDCCH set configured to that wireless device 16 regardless of whether an EPDCCH message is received or not in the EPDCCH set. In some variants, the network node 14 does not transmit aperiodic CSI-RS to a wireless device 16 in a subframe in the PRBs belonging to an EPDCCH set configured to that wireless device 16. The steps related to this alternate embodiment are illustrated in FIG. 17.

Figure 17:
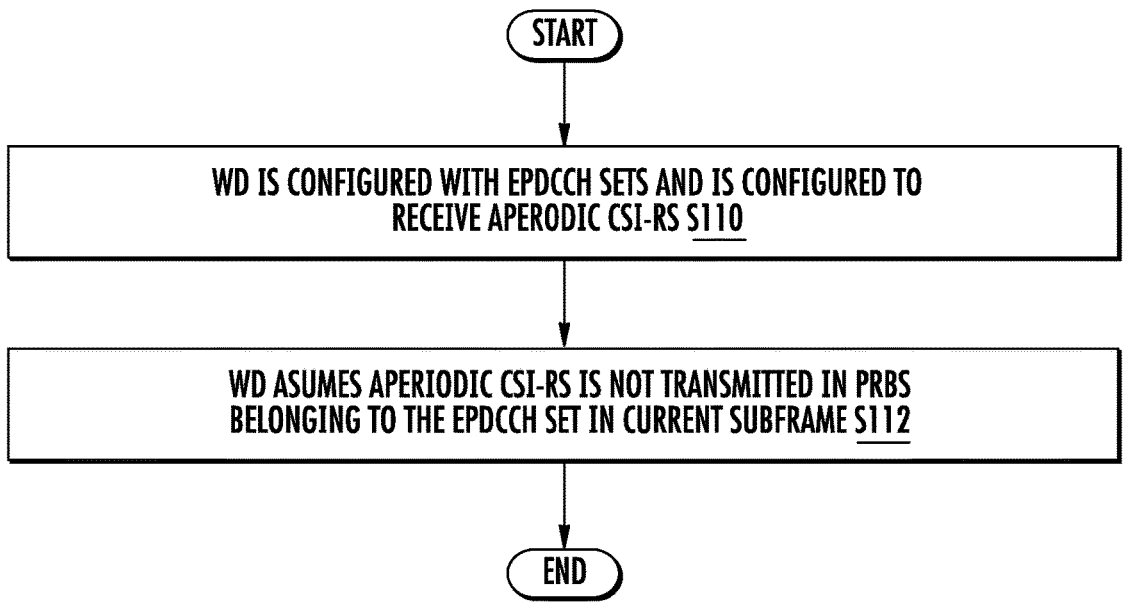
FIG. 17 is a flowchart of an exemplary process for determining that an aperiodic CSI-RS is not transmitted in PRBs belonging to the EPDCCH set in a current subframe.

FIG. 17 is a flowchart of an alternate process in a wireless device 16 of an exemplary process performed by a wireless device 16 of avoiding collision between a downlink control channel and a channel state information reference signal. The process includes configuring the wireless device 16 with EPDCCH sets received by the receiver 20 and is configured to receive aperiodic CSI-RS via the receiver 52 (block S110). The process also includes the wireless device 16 assuming that aperiodic CSI-RS is not transmitted in PRBs belonging to the EPDCCH set in the current subframe (block S112).

Embodiment 2

Figure 18:
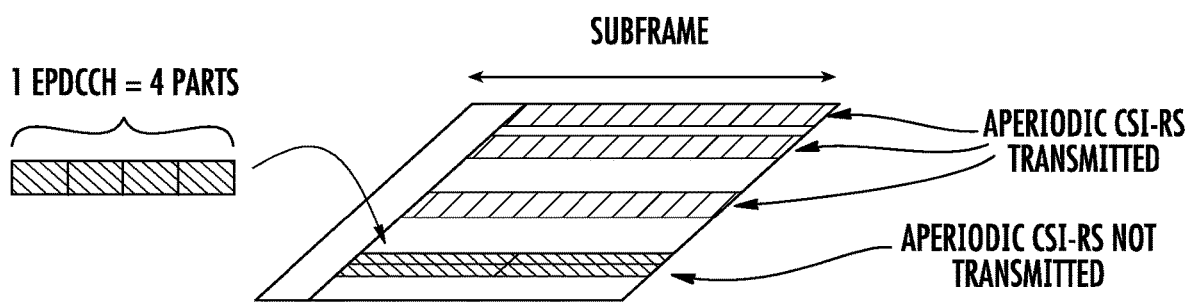
FIG. 18 is an example of an embodiment where the WD assumes aperiodic CSI-RS is not transmitted in a given subframe in the PRBs carrying an EPDCCH message.

A second solution to resolve the collision between EPDCCH REs and REs belonging to aperiodic CSI-RS transmission is to let the wireless device assume that aperiodic CSI-RS is not transmitted in a subframe in the PRBs carrying an EPDCCH message to that wireless device if the wireless device receives an EPDCCH message that indicates an aperiodic CSI-RS has been transmitted in the subframe. If the presence of aperiodic CSI-RS transmission in a subframe is indicated by the PDCCH and the wireless device 16 does not receive an EPDCCH message, then the wireless device 16 is allowed to assume that aperiodic CSI-RS is transmitted in the subframe in the PRBs belonging to the EPDCCH sets configured to the WD. It should be noted that these rules apply only when the wireless device 16 is configured to receive aperiodic CSI-RS which has no subframe configuration associated with it (i.e., the rules do not apply to wireless devices not configured to receive aperiodic CSI-RS transmission). An example of this embodiment is shown in FIG. 18. The steps related to this embodiment are illustrated in FIG. 19.

Figure 19:
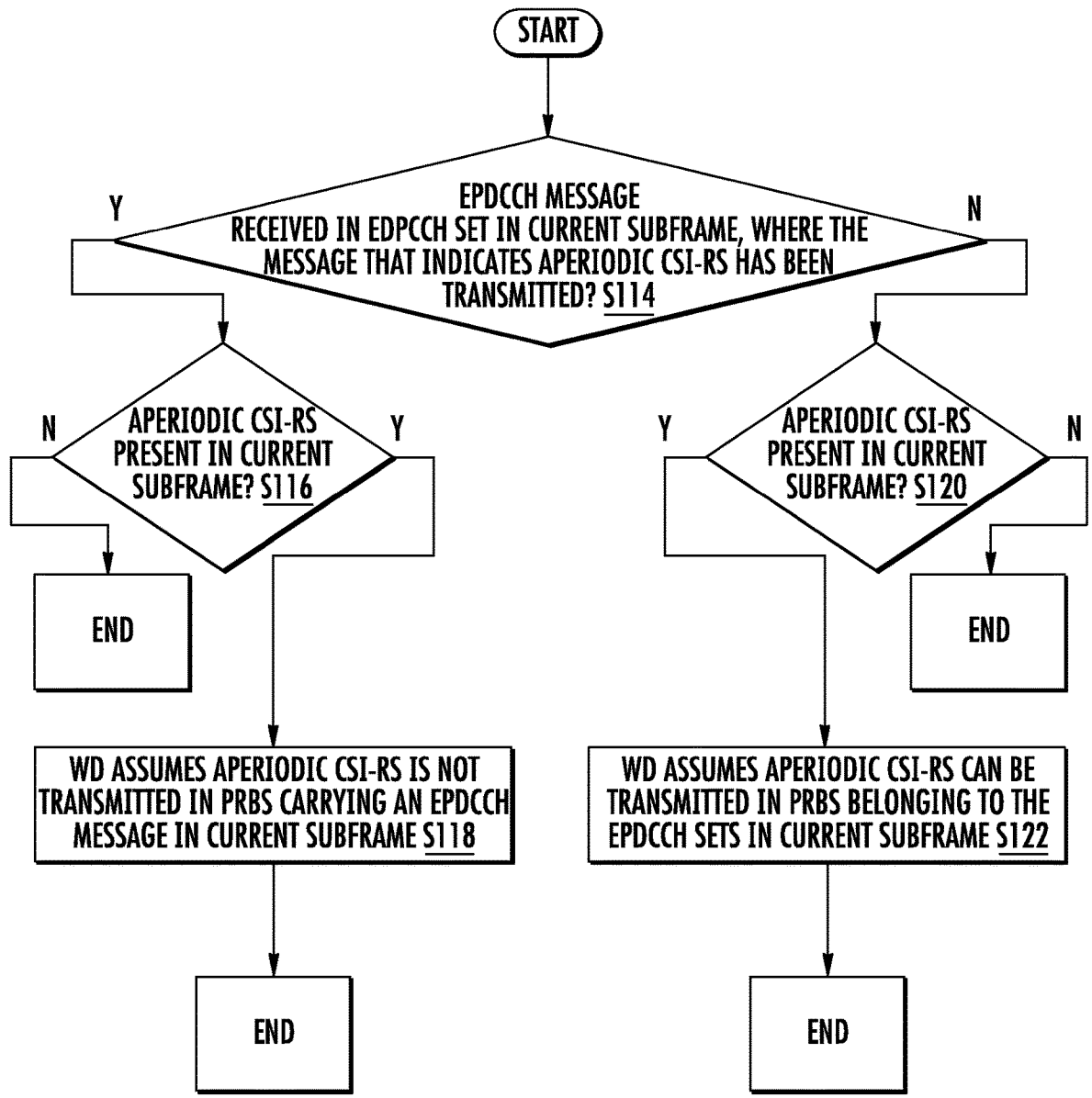
FIG. 19 is a flowchart of an exemplary process for determining when an aperiodic CSI-RS is transmitted in PRBs carrying an EPDCCH message in a current subframe

FIG. 19 is a flowchart of an exemplary process performed by a wireless device 16 of avoiding collision between a downlink control channel and an aperiodic channel state information reference signal. The process includes determining, via the downlink control channel set configuration unit 52, whether an EPDCCH message is received in an EPDCCH set in a current subframe, where the message that indicates an aperiodic CSI-RS has been transmitted (block S114). If so, the process includes determining whether an aperiodic CSI-RS is present in the current subframe (block S116). If so, the wireless device 16 assumes an aperiodic CSI-RS is not transmitted in PRBs carrying an EPDCCH message in the current subframe (block S118). Returning to block S114, if the EPDCCH message is not received in an EPDCCH set in the current subframe indicating that aperiodic CSI-RS has been transmitted, then a determination is made whether an aperiodic CSI-RS is present in the current subframe (block S120). If so, the wireless device 16 assumes an aperiodic CSI-RS can be transmitted in PRBs belonging to the EPDCCH sets in the current subframe (block S122).

In some variants of the embodiment, the wireless device 16 may assume that the network node does not transmit aperiodic CSI-RS in the PRBs carrying an EPDCCH message to that wireless device if the wireless device receives an EPDCCH message that indicates an aperiodic CSI-RS has been transmitted in the subframe. If the presence of aperiodic CSI-RS transmission in a subframe is indicated to the wireless device 16 by the network node 14 via the PDCCH and that the wireless device 16 does not receive an EPDCCH message, then the wireless device 16 may assume that the network node 14 transmits aperiodic CSI-RS to the wireless device in the PRBs belonging to the EPDCCH sets configured to the wireless device 16 in the subframe.

Embodiment 3

A third solution to resolve the collision between EPDCCH REs and REs belonging to aperiodic CSI-RS transmission is to let the wireless device assume that aperiodic CSI-RS is not transmitted in a subframe in any REs carrying an EPDCCH message to that wireless device 16 if the wireless device 16 receives an EPDCCH message in the subframe. For instance, if the REs with index 0 shown in FIG. 7 carry an EPDCCH message, and the wireless device 16 assumes that aperiodic CSI-RS is not transmitted in these REs. If the presence of aperiodic CSI-RS transmission in a subframe is indicated by the PDCCH and the wireless device 16 does not receive an EPDCCH message, then the wireless device 16 is allowed to assume that aperiodic CSI-RS can be transmitted in the subframe in all the REs belonging to the EPDCCH sets configured to the WD. It should be noted that these rules apply only when the wireless device 16 is configured to receive aperiodic CSI-RS which has no subframe configuration associated with it (i.e., the rules do not apply to wireless devices not configured to receive aperiodic CSI-RS transmission). The steps related to this embodiment are illustrated in FIG. 20.

Figure 20:
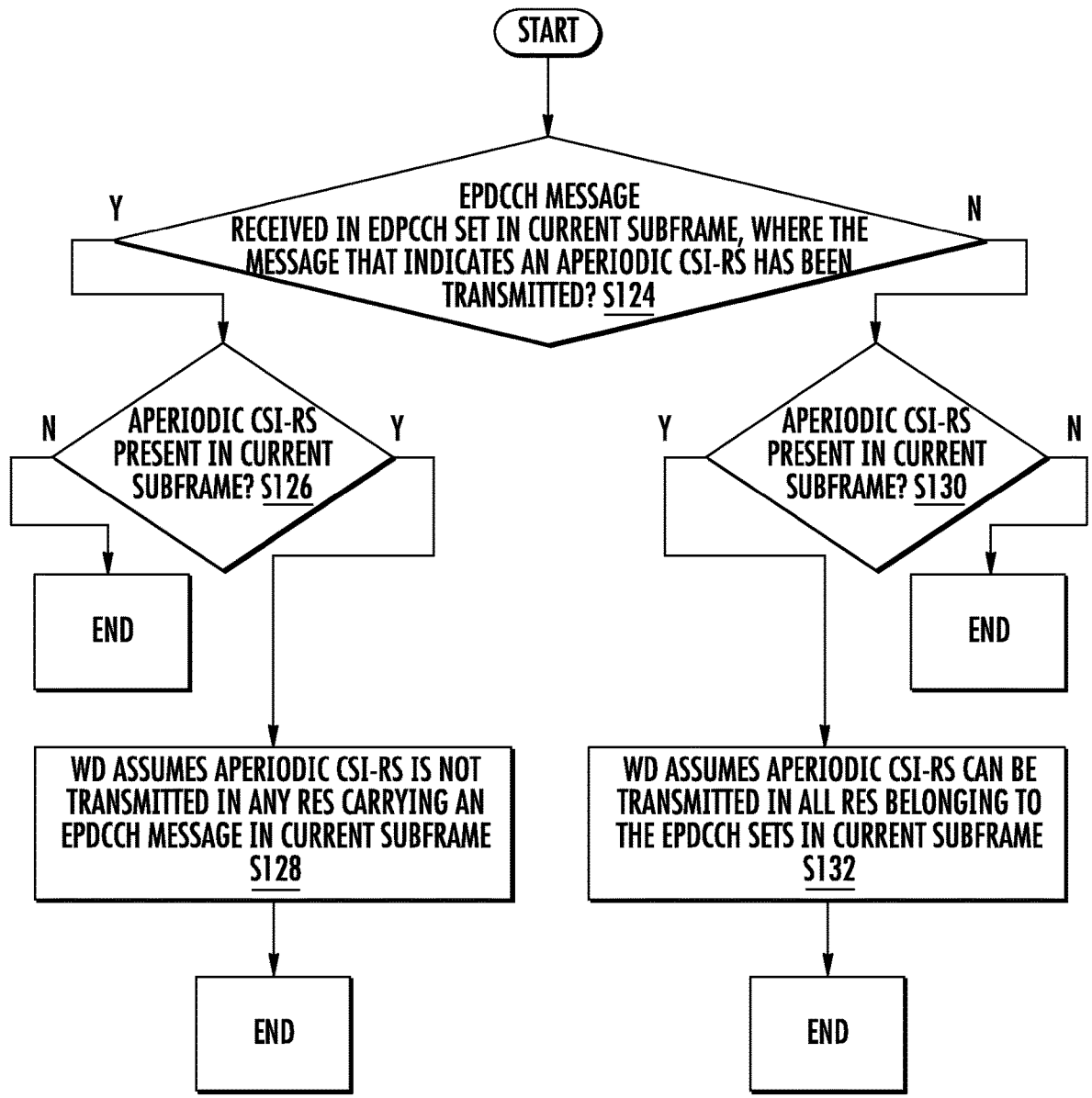
FIG. 20 is a flowchart of an exemplary process for determining when an aperiodic CSI-RS is transmitted in PRBs carrying an EPDCCH message in a current subframe.

FIG. 20 is a flowchart of an exemplary process performed by a wireless device 16 of avoiding collision between a downlink control channel and a channel state information reference signal. The process includes determining whether an EPDCCH message is received in an EPDCCH set in a current subframe, where the message that indicates an aperiodic CSI-RS has been transmitted (block S124). If so, the process includes determining whether an aperiodic CSI-RS is present in the current subframe (block S126). If so, the wireless device 16 assumes an aperiodic CSI-RS is not transmitted in any REs carrying an EPDCCH message in the current subframe (block S128). Returning to block S124, if the EPDCCH message is not received in an EPDCCH set in the current subframe indicating that an aperiodic CSI-RS has been transmitted, then a determination is made whether an aperiodic CSI-RS is present in the current subframe (block S130). If so, the wireless device 16 assumes an aperiodic CSI-RS can be transmitted in all REs belonging to the EPDCCH sets in the current subframe (block S132).

In some variants, the network node 14 does not transmit aperiodic CSI-RS in any REs carrying an EPDCCH message to a wireless device if the wireless device receives an EPDCCH message that indicates an aperiodic CSI-RS has been transmitted in the subframe. If the presence of aperiodic CSI-RS transmission in a subframe is indicated to the wireless device 16 by the network node 14 via the PDCCH and the wireless device 16 does not receive an EPDCCH message, then the network node 14 is allowed to transmit aperiodic CSI-RSs in the subframe in all the REs belonging to the EPDCCH sets configured to the wireless device 16.

Embodiment 4

In the solutions discussed above, for a wireless device 16 configured with EPDCCH but not configured with aperiodic CSI-RS, its EPDCCH performance can be degraded if the EPDCCH collides with aperiodic CSI-RS transmitted to other wireless devices 16.

Figure 21:
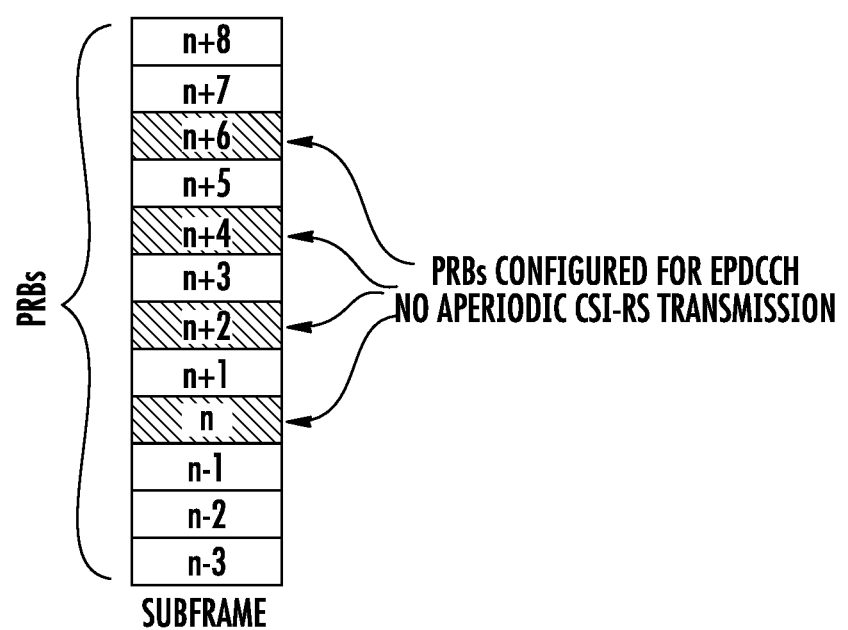
FIG. 21 is an example of an EPDCCH configuration to reduce impact on CSI estimation when aperiodic CSI-RS is not transmitted in the PRBs configured for EPDCCH.

In another embodiment, the network node 14 does not transmit aperiodic CSI-RS to any wireless device in PRBs configured for EPDCCH. The EPDCCH PRBs can be configured such that there is minimum impact on CSI estimation by not transmitting aperiodic CSI-RS in the PRBs. For example, the same EPDCCH PRBs may be configured for all wireless devices and the PRBs may be equally spaced such as PRBs with indices {n,n+2,n+4, . . . }, where n is a non-negative integer. A wireless device configured with both EPDCCH and aperiodic CSI-RS may assume aperiodic CSI-RS is not transmitted on all PRBs configured for EPDCCH. An example is shown in FIG. 21.

Three alternatives on how to capture the previous embodiments in specification text is given.

Figure 22:
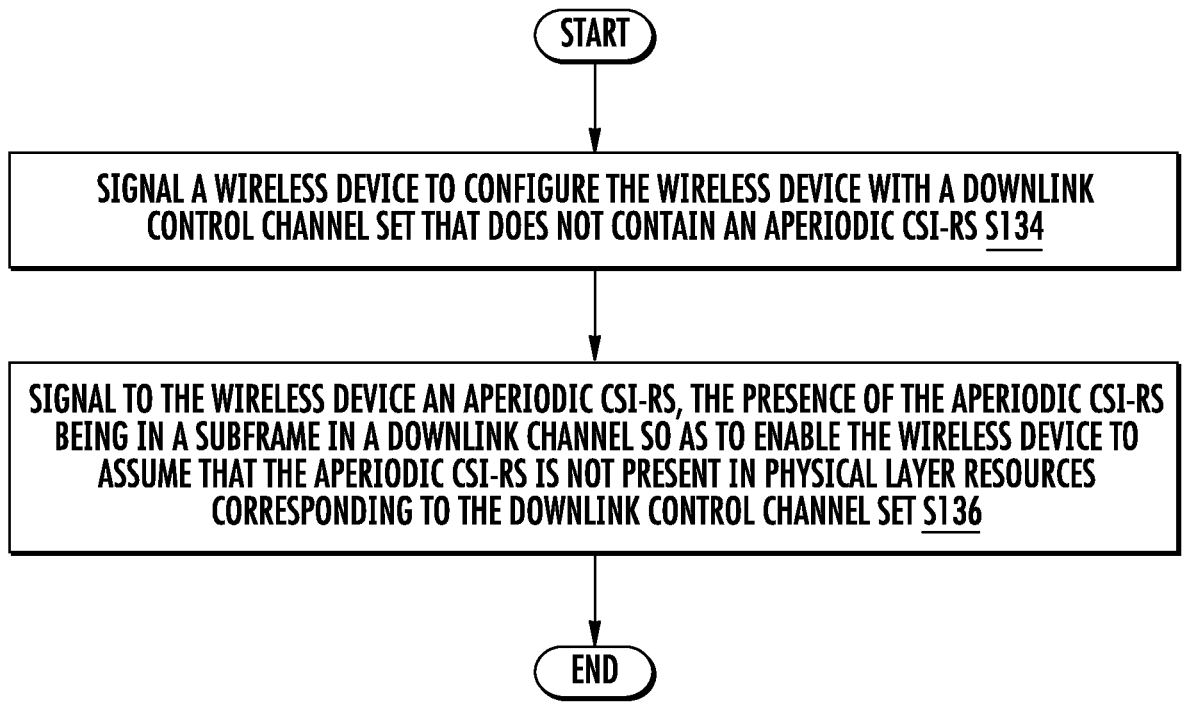
FIG. 22 is a flowchart of an exemplary process in a network node for avoiding collisions between a downlink control channel and a channel state information reference signal.

The wireless device 16 shall assume that CSI reference signals are not transmitted
    in the downlink pilot time slot(s) (DwPTS) in case of frame structure type 2,
    in subframes where transmission of a CSI-RS would collide with SystemInformationBlockType1 messages,
    in the primary cell in subframes configured for transmission of paging messages in the primary cell for any wireless device with the cell-specific paging configuration,
    Alt.1 . . . in physical resource-block pair(s) belonging to an EPDCCH set configured to the wireless device in that subframe.
    Alt.2 . . . in any physical resource-block pair(s) carrying an EPDCCH associated with a trigger of the CSI reference signals using an aperiodic trigger
    Alt.3 . . . in any resource elements carrying an EPDCCH associated with a trigger of the CSI reference signals using an aperiodic trigger FIG. 22 is a flowchart of an exemplary process in a network node 14 for avoiding collisions between a downlink control channel and an aperiodic channel state information reference signal. The process includes signalling a wireless device 16 to configure, via the downlink control channel set configuration unit 52, the wireless device with a downlink control channel set that does not contain an aperiodic CSI-RS (block s134). The process also includes signalling to the wireless device, via the transmitter 32, an aperiodic CSI-RS, the presence of the CSI-RS being in a subframe in a downlink channel so as to enable the wireless device 16 to assume that the CSI-RS is not present in physical layer resources contained within the downlink control channel set (block S136).

Figure 23:
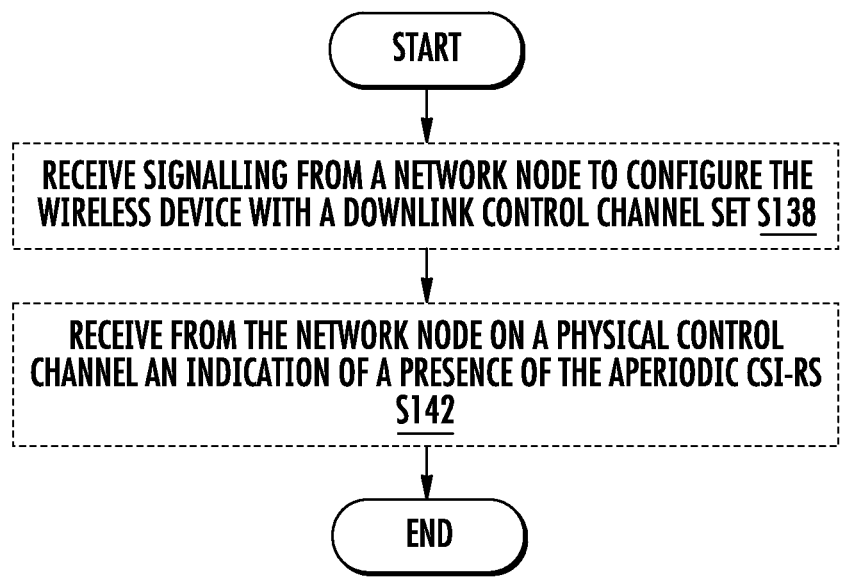
FIG. 23 is a flowchart of an exemplary process in a wireless device for avoiding collisions between a downlink control channel and a channel state information reference signal.

FIG. 23 is a flowchart of an exemplary process in a wireless device 16 for avoiding collisions between a downlink control channel and an aperiodic channel state information reference signal. The process may include, optionally, receiving, via the receiver 20, signalling from a network node 14 to configure the wireless device 16 with a downlink control channel set (block S138). The process may also include, optionally, configuring the wireless device 16, via the downlink control channel set configuration unit 52, with the downlink control channel set (not shown)). The process may also include, optionally, receiving, via the receiver 20, from the network node 14 on a physical control channel an indication of a presence of the aperiodic CSI-RS (block S142). The process further may further include receiving, via the receiver 54, the aperiodic CSI-RS based on the assumption that the aperiodic CSI-RS is not present in physical layer resources corresponding to the downlink control channel set not shown).

Figure 24:
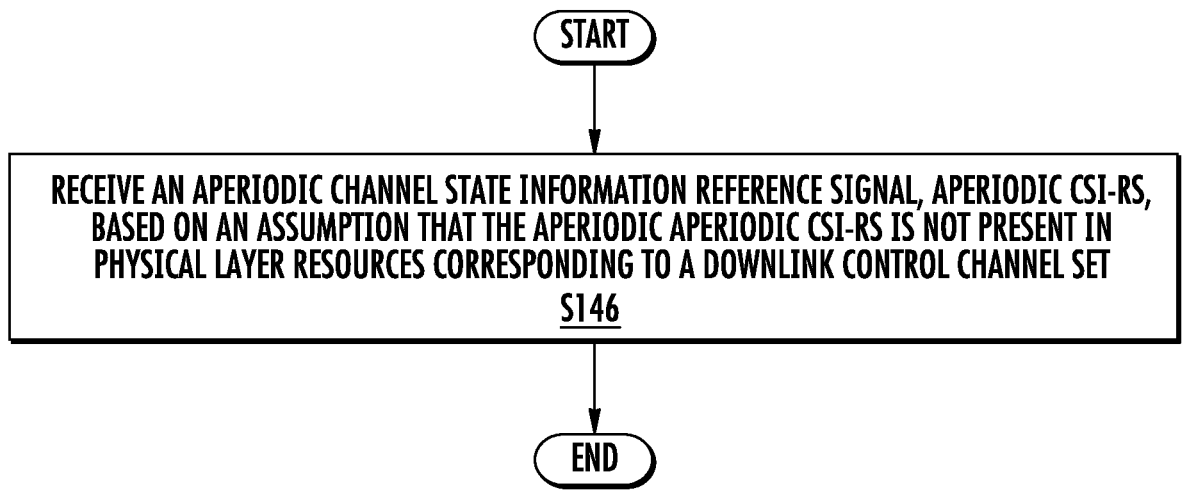
FIG. 24 is a flowchart of an exemplary process in a wireless device constructed in accordance principles set forth herein.

FIG. 24 is a flowchart of an exemplary process that includes receiving an aperiodic CSI-RS based on an assumption that the aperiodic CSI-RS is not present in physical layer resources corresponding to a DL control channel set (block S146).

Thus, in some embodiments, a method in a wireless device 16 is provided. The method includes receiving an aperiodic channel state information reference signal, aperiodic CSI-RS, based on an assumption that the aperiodic CSI-RS is not present in physical layer resources corresponding to a downlink control channel set. In some embodiments, the aperiodic CSI-RS can be transmitted in the physical layer resources in at least some defined conditions. In some embodiments, the method includes at least one of: receiving signalling to configure the wireless device 16 for a downlink control channel set and receiving on a physical control channel an indication of a presence of the aperiodic CSI-RS. In some embodiments, the indication of a presence of the aperiodic CSI-RS indicates that the aperiodic CSI-RS is present in one of a subframe or a slot. In some embodiments, the indication of a presence of the aperiodic CSI-RS indicates that the aperiodic CSI-RS is present in a predetermined number of OFDM symbols.

In some embodiments, a method in a wireless device 16 is provided. The method includes receiving an aperiodic CSI-RS based on the assumption that the aperiodic CSI-RS is not present in physical layer resources contained within the downlink control channel set (block S144). The method may also include at least one of receiving signalling, e.g. from a network node 14 to configure the wireless device 16 with a downlink control channel set (block S138). The method may also includes configuring the wireless device 16 with the downlink control channel set (block S140). The method may also include receiving from the network node 14 on a physical control channel an indication of a presence of the aperiodic CSI-RS (block S142).

In some embodiments, the wireless device 16 assumes that the aperiodic CSI-RS is not transmitted in a subframe in physical resource blocks (PRBs) belonging to the downlink control channel set with which the wireless device 16 is configured if the wireless device 16 receives a downlink control channel message in the subframe that indicates that an aperiodic CSI-RS has been transmitted in the downlink control channel set. In some embodiments, if a presence of the aperiodic CSI-RS in a subframe is indicated by a physical downlink control channel (PDCCH) and the wireless device 16 does not receive a downlink control channel message in the downlink control channel set, then the wireless device 16 assumes that aperiodic aperiodic CSI-RS is transmitted in the subframe in the physical resource blocks (PRBs) belonging to the downlink control channel set. In some embodiments, a presence of the aperiodic CSI-RS in a subframe is indicated to the wireless device 16 via a physical downlink control channel (PDCCH) and if the wireless device 16 does not receive a downlink control channel message that indicates that the aperiodic CSI-RS has been transmitted in the downlink control channel set, then the wireless device 16 assumes that the aperiodic CSI-RS is contained in the physical resource blocks (PRBs) belonging to the downlink control channel set in the subframe. In some embodiments, the wireless device 16 assumes that the aperiodic CSI-RS is not transmitted in a subframe in the physical resource blocks (PRBs) belonging to the downlink control channel set with which the wireless device 16 is configured regardless of whether a downlink control channel message is received in the downlink control channel set.

In some embodiments, the wireless device 16 assumes that the aperiodic CSI-RS is not transmitted in a subframe of physical resource blocks (PRBs) carrying a downlink control channel message to the wireless device 16 if the wireless device 16 receives a downlink control message in the subframe that indicates that the aperiodic CSI-RS has been transmitted. In some embodiments, if a presence of the aperiodic CSI-RS in a subframe is indicated by a physical downlink control channel (PDCCH) and the wireless device 16 does not receive a downlink control channel message, then the wireless device 16 assumes the aperiodic CSI-RS is transmitted in the subframe in the physical resource blocks (PRBs) belonging to the downlink control channel set with which the wireless device 16 is configured. In some embodiments, the wireless device 16 assumes that a network node 14 does not transmit aperiodic CSI-RS in the physical resource blocks, PRBs, carrying a downlink control channel message to that wireless device 16 if the wireless device 16 receives a downlink control channel message that indicates that an aperiodic CSI-RS has been transmitted in the subframe. In some embodiments, if a presence of the aperiodic CSI-RS in a subframe is indicated to the wireless device 16 via a physical downlink control channel (PDCCH) and if the wireless device 16 does not receive a downlink control channel message, then the wireless device 16 assumes that aperiodic CSI-RS is transmitted to the wireless device 16 in the physical resource blocks (PRBs) belonging to the downlink control channel set with which the wireless device 16 is configured in the subframe.

In some embodiments, the wireless device 16 assumes that the aperiodic CSI-RS is not transmitted in a subframe in any resource elements, REs, carrying a downlink control channel message to the wireless device 16 if the wireless device 16 receives a downlink control channel message in the subframe. In some embodiments, if a presence of the aperiodic CSI-RS in a subframe is indicated by a physical downlink control channel (PDCCH) and the wireless device 16 does not receive a downlink control channel message, then the wireless device 16 assumes that the aperiodic CSI-RS can be transmitted in the subframe in all resource elements, REs, belonging to the downlink control channel set with which the wireless device 16 is configured. In some embodiments, the wireless device 16 assumes that aperiodic CSI-RS are not transmitted in a downlink pilot time slot in a case of frame structure type 2. In some embodiments, the wireless device 16 assumes that aperiodic CSI-RS are not transmitted in subframes where transmission of the aperiodic CSI-RS would collide with a SystemInformationBlockType1 message. In some embodiments, the wireless device 16 assumes that aperiodic CSI-RS are not transmitted in physical resource block pairs belonging to the downlink control channel set with which the wireless device 16 is configured in the subframe.

In some embodiments, the wireless device 16 assumes that aperiodic CSI-RS are not transmitted in physical resource block pairs carrying the downlink control channel associated with a trigger of the aperiodic CSI-RS using an aperiodic trigger. In some embodiments, the wireless device 16 assumes that aperiodic CSI-RS are not transmitted in any resource elements (RE) carrying the downlink control channel associated with a trigger of the aperiodic CSI-RS using an aperiodic trigger. In some embodiments, the downlink control channel is an enhanced physical downlink control channel (EPDCCH) and a downlink control channel message is an EPDCCH message in a long term evolution communication system. In some embodiments, the downlink control channel set is a core set in a New Radio, NR, communication system.

In some embodiments, a wireless device 16 configured to avoid collision between a downlink control channel and a channel state information reference signal (aperiodic CSI-RS) is provided. The wireless device 16 includes processing circuitry 42 configured to: configure the wireless device 16 with a downlink control channel set according to signalling received from a network node. The wireless device 16 further includes a transceiver 48 configured to receive signalling from a network node 14 to configure the wireless device 16 with the downlink control channel set. The transceiver 48 is further configured to receive from the network node 14 on a physical control channel an indication of a presence of the aperiodic CSI-RS in a subframe. The transceiver 48 is further configured to receive the aperiodic CSI-RS based on the assumption that the aperiodic CSI-RS is not present in physical layer resources contained within the downlink control channel set. In some embodiments, the indication of a presence of the aperiodic CSI-RS indicates that the aperiodic CSI-RS is present in one of a subframe or a slot. In some embodiments, the indication of a presence of the aperiodic CSI-RS indicates that the aperiodic CSI-RS is present in a predetermined number of OFDM symbols.

In some embodiments, the wireless device 16 assumes that the aperiodic CSI-RS is not transmitted in a subframe in physical resource blocks (PRBs) belonging to the downlink control channel set with which the wireless device 16 is configured if the wireless device 16 receives a downlink control channel message in the subframe that indicates that an aperiodic CSI-RS has been transmitted in the downlink control channel set. In some embodiments, if a presence of the aperiodic CSI-RS in a subframe is indicated by a physical downlink control channel (PDCCH) and the wireless device 16 does not receive a downlink control channel message in the downlink control channel set, then the wireless device 16 assumes that aperiodic aperiodic CSI-RS is transmitted in the subframe in the physical resource blocks (PRBs) belonging to the downlink control channel set. In some embodiments, if a presence of the aperiodic CSI-RS in a subframe is indicated to the wireless device 16 via a physical downlink control channel (PDCCH) and if the wireless device 16 does not receive a downlink control channel message that indicates that the aperiodic CSI-RS has been transmitted in the downlink control channel set, then the wireless device 16 assumes that the aperiodic CSI-RS is contained in the physical resource blocks (PRBs) belonging to the downlink control channel set in the subframe.

In some embodiments, the wireless device 16 assumes that aperiodic aperiodic CSI-RS is not transmitted in a subframe in the physical resource blocks (PRBs) belonging to the downlink control channel set with which the wireless device 16 is configured regardless of whether a downlink control channel message is received in the downlink control channel set. In some embodiments, the wireless device 16 assumes that the aperiodic CSI-RS is not transmitted in a subframe of physical resource blocks (PRBs) carrying a downlink control channel message to the wireless device 16 if the wireless device 16 receives a downlink control message in the subframe that indicates that the aperiodic CSI-RS has been transmitted. In some embodiments, if a presence of the aperiodic CSI-RS in a subframe is indicated by a physical downlink control channel (PDCCH) and the wireless device 16 does not receive a downlink control channel message, then the wireless device 16 assumes the aperiodic CSI-RS is transmitted in the subframe in the physical resource blocks (PRBs) belonging to the downlink control channel set with which the wireless device 16 is configured.

In some embodiments, the wireless device 16 assumes that a network node 14 does not transmit aperiodic CSI-RS in the physical resource blocks (PRBs) carrying a downlink control channel message to that wireless device 16 if the wireless device 16 receives a downlink control channel message that indicates that an aperiodic CSI-RS has been transmitted in the subframe. In some embodiments, if a presence of the aperiodic CSI-RS in a subframe is indicated to the wireless device 16 via a physical downlink control channel (PDCCH) and if the wireless device 16 does not receive a downlink control channel message, then the wireless device 16 assumes that aperiodic CSI-RS is transmitted to the wireless device 16 in the physical resource blocks (PRBs) belonging to the downlink control channel set with which the wireless device 16 is configured in the subframe. In some embodiments, the wireless device 16 assumes that the aperiodic CSI-RS is not transmitted in a subframe in any resource elements, REs, carrying a downlink control channel message to the wireless device 16 if the wireless device 16 receives a downlink control channel message in the subframe. In some embodiments, if a presence of the aperiodic CSI-RS in a subframe is indicated by a physical downlink control channel (PDCCH) and the wireless device 16 does not receive a downlink control channel message, then the wireless device 16 assumes that the aperiodic CSI-RS can be transmitted in the subframe in all resource elements, REs, belonging to the downlink control channel set with which the wireless device 16 is configured.

In some embodiments, the wireless device 16 assumes that aperiodic CSI-RS are not transmitted in a downlink pilot time slot in a case of frame structure type 2. In some embodiments, the wireless device 16 assumes that aperiodic CSI-RS are not transmitted in subframes where transmission of the aperiodic CSI-RS would collide with a SystemInformationBlockType1 message. In some embodiments, the wireless device 16 assumes that aperiodic CSI-RS are not transmitted in physical resource block pairs belonging to the downlink control channel set with which the wireless device 16 is configured in the subframe. In some embodiments, the wireless device 16 assumes that aperiodic CSI-RS are not transmitted in physical resource block pairs carrying the downlink control channel associated with a trigger of the aperiodic CSI-RS using an aperiodic trigger. In some embodiments, the wireless device 16 assumes that aperiodic CSI-RS are not transmitted in any resource elements, RE, carrying the downlink control channel associated with a trigger of the aperiodic CSI-RS using an aperiodic trigger. In some embodiments, the downlink control channel is an enhanced physical downlink control channel (EPDCCH), and a downlink control channel message is an EPDCCH message in a long term evolution communication system. In some embodiments, the downlink control channel set is a core set in a New Radio, NR, communication system.

In some embodiments, a wireless device 16 configured to avoid collision between downlink control channel and a channel state information reference signal (aperiodic CSI-RS), is provided. The wireless device 16 includes a downlink control channel set configuration receiver module 20 configured to receive signalling from a network node 14 to configure the wireless device 16 with a downlink control channel set. The wireless device 16 also includes a downlink control channel set configuration module 53 configured to configure the wireless device 16 with a downlink control channel set according to signalling received from a network node 14. The wireless device 16 further includes an aperiodic CSI-RS indication receiver module 55 configured to receive from the network node on a physical control channel an indication of a presence of the aperiodic CSI-RS in a subframe. The wireless device 16 also includes an aperiodic CSI-RS receiver module 57 configured to receive the aperiodic CSI-RS based on the assumption that the aperiodic CSI-RS is not present in physical layer resources contained within the downlink control channel set.

In some embodiments, a method in a network node 14 of avoiding collision between a downlink control channel and a channel state information reference signal, aperiodic CSI-RS, is provided. The method includes signalling a wireless device 16 to configure the wireless device 16 with a downlink control channel set that does not contain an aperiodic CSI-RS (block S134). The method also includes signalling to the wireless device 16 an aperiodic CSI-RS, the presence of the aperiodic CSI-RS being in a subframe in a downlink channel so as to enable the wireless device 16 to assume that the aperiodic CSI-RS is not present in physical layer resources contained within the downlink control channel set (block S136).

In some embodiments, the network node does not transmit the aperiodic CSI-RS to the wireless device in a subframe in the physical resource blocks (PRBs) belonging to the downlink control channel set configured to the wireless device. In some embodiments, the network node indicates a presence of the aperiodic CSI-RS in the subframe and the wireless device does not assume that the aperiodic CSI-RS is not present in the downlink control channel set. In some embodiments, the network node 14 indicates a presence of the aperiodic CSI-RS in the subframe and transmits the aperiodic CSI-RS in the subframe in all resource elements belonging to the downlink control channel set.

In some embodiments, a network node 14 configured for avoiding collision between a downlink control channel and a channel state information reference signal, aperiodic CSI-RS is provided. The network node 14 includes a transceiver 28 configured to signal to a wireless device 16 to configure the wireless device 16 with a downlink control channel set that does not contain an aperiodic CSI-RS. The transceiver 28 is configured to signal to the wireless device an aperiodic CSI-RS, the presence of the aperiodic CSI-RS being in a subframe in a downlink channel so as to enable the wireless device 16 to assume that the aperiodic CSI-RS is not present in physical layer resources contained within the downlink control channel set.

In some embodiments, the network node 14 does not transmit the aperiodic CSI-RS to the wireless device 16 in a subframe in the physical resource blocks (PRBs) belonging to the downlink control channel set configured to the wireless device 16. In some embodiments, the network node 14 indicates a presence of the aperiodic CSI-RS in the subframe and the wireless device 16 does not assume that the aperiodic CSI-RS is not present in the downlink control channel set. In some embodiments, the network node 16 indicates a presence of the aperiodic CSI-RS in the subframe and transmits the aperiodic CSI-RS in the subframe in all resource elements belonging to the downlink control channel set.

In some embodiments, a network node 14 configured for avoiding collision between a downlink control channel and a channel state information reference signal, aperiodic CSI-RS, is provided. The network node 14 includes a transceiver module 29 configured to signal to a wireless device 16 to configure the wireless device 16 with a downlink control channel set that does not contain an aperiodic CSI-RS. The transceiver module 29 is also configured to signal to the wireless device 16 an aperiodic CSI-RS, the presence of the aperiodic CSI-RS being in a subframe in a downlink channel so as to enable the wireless device 16 to assume that the aperiodic CSI-RS is not present in physical layer resources contained within (or corresponding to) the downlink control channel set.

In the present disclosure "resources belonging to" may be interpreted as "resources corresponding to", as it will be recognized by a person skilled in the art.

Some embodiments include the following.

Embodiment 1

A method of avoiding collision between an EPDCCH and a CSI-RS in a wireless device, the method comprising receiving signaling that configures the wireless device with EPDCCH set(s) and to receive the CSI-RS, wherein the presence of the CSI-RS in a subframe is indicated to the wireless device in a physical control channel; and receiving the CSI-RS based on the assumption that the CSI-RS is not present in physical layer resources contained within the EPDCCH set(s).

Embodiment 2

The method of Embodiment 1, wherein the wireless device can assume that the CSI-RS is not transmitted in a subframe in the PRBs belonging to an EPDCCH set configured to the WD.

Embodiment 3

The method of Embodiment 1, wherein the wireless device can assume that the CSI-RS is not transmitted in the PRBs belonging to an EPDCCH set in a subframe if the wireless device receives an EPDCCH message that indicates the CSI-RS has been transmitted in that EPDCCH set in the subframe.

Embodiment 4

The method of Embodiment 1, wherein the wireless device is allowed to assume that the CSI-RS is transmitted in the PRBs belonging to that EPDCCH set in a subframe if the presence of the CSI-RS transmission in a subframe is indicated by PDCCH and the wireless device does not receive an EPDCCH message in an EPDCCH set.

Embodiment 5

The method of Embodiment 1, wherein the wireless device can assume that the CSI-RS is not transmitted in a subframe in the PRBs carrying an EPDCCH message that indicates the CSI-RS has been transmitted to the wireless device if the wireless device receives an EPDCCH message in the subframe.

Embodiment 6

The method of Embodiment 1, wherein the wireless device can assume that the CSI-RS is not transmitted in a subframe in any REs carrying an EPDCCH message to the wireless device if the wireless device receives an EPDCCH message that indicates the CSI-RS has been transmitted in the subframe.

Embodiment 7

A wireless device configured to avoid collision between and EPDCCH and a CSI-RS, the wireless device comprising:

processing circuitry including a memory and a processor, the memory containing instructions that when executed by the processor, cause the processor to:
receive signalling that configures the wireless device with EPDCCH set(s) and to receive the CSI-RS, wherein the presence of the CSI-RS in a subframe is indicated to the wireless device in a physical control channel; and
receive the CSI-RS based on the assumption that the CSI-RS is not present in physical layer resources contained within the EPDCCH set(s).

Embodiment 8

The wireless device of Embodiment 7, wherein the wireless device can assume that the CSI-RS is not transmitted in a subframe in the PRBs belonging to an EPDCCH set configured to the WD.

Embodiment 9

The wireless device of Embodiment 7, wherein the wireless device can assume that the CSI-RS is not transmitted in the PRBs belonging to an EPDCCH set in a subframe if the wireless device receives an EPDCCH message that indicates the CSI-RS has been transmitted in that EPDCCH set in the subframe.

Embodiment 10

The wireless device of Embodiment 7, wherein the wireless device is allowed to assume that the CSI-RS is transmitted in the PRBs belonging to that EPDCCH set in a subframe if the presence of the CSI-RS transmission in a subframe is indicated by PDCCH and the wireless device does not receive an EPDCCH message in an EPDCCH set.

Embodiment 11

The wireless device of Embodiment 7, wherein the wireless device can assume that the CSI-RS is not transmitted in a subframe in the PRBs carrying an EPDCCH message that indicates the CSI-RS has been transmitted to the wireless device if the wireless device receives an EPDCCH message in the subframe.

Embodiment 12

The wireless device of Embodiment 7, wherein the wireless device can assume that the CSI-RS is not transmitted in a subframe in any REs carrying an EPDCCH message to the wireless device if the wireless device receives an EPDCCH message that indicates the CSI-RS has been transmitted in the subframe.

Embodiment 13

A wireless device configured to avoid collision between an EPDCCH and a CSI-RS, the wireless device comprising:
an EPDCCH configuration module configured to receive signalling that configures the wireless device with EPDCCH set(s) and to receive the CSI-RS, wherein the presence of the CSI-RS in a subframe is indicated to the wireless device in a physical control channel; and
a CSI-RS receiver module configured to receive the CSI-RS based on the assumption that the CSI-RS is not present in physical layer resources contained within the EPDCCH set(s).

In some embodiments, a method in a wireless device is provided. The method includes receiving the aperiodic CSI-RS based on the assumption that the aperiodic CSI-RS is not present in physical layer resources contained within the downlink control channel set. The method may also include receiving signalling to configure the wireless device with a downlink control channel set. The method may also include receiving from the network node on a physical control channel an indication of a presence of the aperiodic CSI-RS in a subframe.

In some embodiments, the indication of a presence of the aperiodic CSI-RS indicates that the aperiodic CSI-RS is present in one of a subframe or a slot. In some embodiments, the indication of a presence of the aperiodic CSI-RS indicates that the aperiodic CSI-RS is present in a predetermined number of OFDM symbols.

In some embodiments, the aperiodic CSI-RS can be transmitted in the physical layer resources in at least some defined conditions.

In some embodiments, the wireless device assumes that the aperiodic CSI-RS is not transmitted in a subframe in physical resource blocks, PRBs, corresponding to the downlink control channel set with which the wireless device is configured if the wireless device receives a downlink control channel message in the subframe that indicates that an aperiodic CSI-RS has been transmitted in the downlink control channel set. In some embodiments, if a presence of the aperiodic CSI-RS in a subframe is indicated by a downlink control channel, such as PDCCH, and the wireless device does not receive a downlink control channel message in the downlink control channel set, then the wireless device assumes that aperiodic CSI-RS is transmitted in the subframe in the physical resource blocks, PRBs, corresponding to the downlink control channel set. In some embodiments, a presence of the aperiodic CSI-RS in a subframe is indicated to the wireless device via a downlink control channel, such as PDCCH, and if the wireless device does not receive a downlink control channel message that indicates that the aperiodic CSI-RS has been transmitted in the downlink control channel set, then the wireless device assumes that the aperiodic CSI-RS is contained in the physical resource blocks, PRBs, corresponding to the downlink control channel set in the subframe. In some embodiments, the wireless device assumes that the aperiodic CSI-RS is not transmitted in a subframe in the physical resource blocks, PRBs, corresponding to the downlink control channel set with which the wireless device is configured regardless of whether a downlink control channel message is received in the downlink control channel set.

In some embodiments, the wireless device assumes that the aperiodic CSI-RS is not transmitted in a subframe of physical resource blocks, PRBs, carrying a downlink control channel message to the wireless device if the wireless device receives a downlink control message in the subframe that indicates that the aperiodic CSI-RS has been transmitted. In some embodiments, if a presence of the aperiodic CSI-RS in a subframe is indicated by a downlink control channel, such as PDCCH, and the wireless device does not receive a downlink control channel message, then the wireless device assumes the aperiodic CSI-RS is transmitted in the subframe in the physical resource blocks, PRBs, corresponding to the downlink control channel set with which the wireless device is configured. In some embodiments, the wireless device assumes that a network node does not transmit aperiodic CSI-RS in the physical resource blocks, PRBs, carrying a downlink control channel message to that wireless device if the wireless device receives a downlink control channel message that indicates that a aperiodic CSI-RS has been transmitted in the subframe. In some embodiments, if a presence of the aperiodic CSI-RS in a subframe is indicated to the wireless device via a downlink control channel, such as PDCCH, and if the wireless device does not receive a downlink control channel message, then the wireless device assumes that aperiodic CSI-RS is transmitted to the wireless device in the physical resource blocks, PRBs, corresponding to the downlink control channel set with which the wireless device is configured in the subframe.

In some embodiments, the wireless device assumes that the aperiodic CSI-RS is not transmitted in a subframe in any resource elements, REs, carrying a downlink control channel message to the wireless device if the wireless device receives a downlink control channel message in the subframe. In some embodiments, if a presence of the aperiodic CSI-RS in a subframe is indicated by a downlink control channel, such as PDCCH, and the wireless device does not receive a downlink control channel message, then the wireless device assumes that the aperiodic CSI-RS can be transmitted in the subframe in all resource elements, REs, corresponding to the downlink control channel set with which the wireless device is configured. In some embodiments, the wireless device assumes that aperiodic CSI-RS are not transmitted in a downlink pilot time slot in a case of frame structure type 2. In some embodiments, the wireless device assumes that aperiodic CSI-RS are not transmitted in subframes where transmission of the aperiodic CSI-RS would collide with a SystemInformationBlockType1 message. In some embodiments, the wireless device assumes that aperiodic CSI-RS are not transmitted in physical resource block pairs corresponding to the downlink control channel set with which the wireless device is configured in the subframe.

In some embodiments, the wireless device assumes that aperiodic CSI-RS are not transmitted in physical resource block pairs carrying the downlink control channel associated with a trigger of the aperiodic CSI-RS using an aperiodic trigger. In some embodiments, the wireless device assumes that aperiodic CSI-RS are not transmitted in any resource elements, RE, carrying the downlink control channel associated with a trigger of the aperiodic CSI-RS using an aperiodic trigger. In some embodiments, the downlink control channel is an enhanced physical downlink control channel, EPDCCH, and a downlink control channel message is an EPDCCH message in a long term evolution communication system.

In some embodiments, a wireless device is provided. The wireless device includes processing circuitry configured to receive the aperiodic CSI-RS based on the assumption that the aperiodic CSI-RS is not present in physical layer resources contained within the downlink control channel set. The processing circuitry may be further configured to receive signalling from a network node to configure the wireless device with the downlink control channel set and/or to receive from the network node on a physical control channel an indication of a presence of the aperiodic CSI-RS. The transceiver is further configured to In some embodiments, the wireless device assumes that the aperiodic CSI-RS is not transmitted in a subframe in physical resource blocks, PRBs, corresponding to the downlink control channel set with which the wireless device is configured if the wireless device receives a downlink control channel message in the subframe that indicates that aperiodic CSI-RS has been transmitted in the downlink control channel set. In some embodiments, if a presence of the aperiodic CSI-RS in a subframe is indicated by a downlink control channel, such as PDCCH, and the wireless device does not receive a downlink control channel message in the downlink control channel set, then the wireless device assumes that aperiodic aperiodic CSI-RS is transmitted in the subframe in the physical resource blocks, PRBs, corresponding to the downlink control channel set. In some embodiments, if a presence of the aperiodic CSI-RS in a subframe is indicated to the wireless device via a downlink control channel, such as PDCCH, and if the wireless device does not receive a downlink control channel message that indicates that the aperiodic CSI-RS has been transmitted in the downlink control channel set, then the wireless device assumes that the aperiodic CSI-RS is contained in the physical resource blocks, PRBs, corresponding to the downlink control channel set in the subframe.

In some embodiments, the wireless device assumes that aperiodic aperiodic CSI-RS is not transmitted in a subframe in the physical resource blocks, PRBs, corresponding to the downlink control channel set with which the wireless device is configured regardless of whether a downlink control channel message is received in the downlink control channel set. In some embodiments, the wireless device assumes that the aperiodic CSI-RS is not transmitted in a subframe of physical resource blocks, PRBs, carrying a downlink control channel message to the wireless device if the wireless device receives a downlink control message in the subframe that indicates that the aperiodic CSI-RS has been transmitted. In some embodiments, if a presence of the aperiodic CSI-RS in a subframe is indicated by a downlink control channel, such as PDCCH, and the wireless device does not receive a downlink control channel message, then the wireless device assumes the aperiodic CSI-RS is transmitted in the subframe in the physical resource blocks, PRBs, corresponding to the downlink control channel set with which the wireless device is configured.

In some embodiments, the wireless device assumes that a network node does not transmit aperiodic CSI-RS in the physical resource blocks, PRBs, carrying a downlink control channel message to that wireless device if the wireless device receives a downlink control channel message that indicates that a aperiodic CSI-RS has been transmitted in the subframe. In some embodiments, if a presence of the aperiodic CSI-RS in a subframe is indicated to the wireless device via a downlink control channel, such as PDCCH, and if the wireless device does not receive a downlink control channel message, then the wireless device assumes that aperiodic CSI-RS is transmitted to the wireless device in the physical resource blocks, PRBs, corresponding to the downlink control channel set with which the wireless device is configured in the subframe. In some embodiments, the wireless device assumes that the aperiodic CSI-RS is not transmitted in a subframe in any resource elements, REs, carrying a downlink control channel message to the wireless device if the wireless device receives a downlink control channel message in the subframe. In some embodiments, if a presence of the aperiodic CSI-RS in a subframe is indicated by a downlink control channel, such as PDCCH, and the wireless device does not receive a downlink control channel message, then the wireless device assumes that the aperiodic CSI-RS can be transmitted in the subframe in all resource elements, REs, corresponding to the downlink control channel set with which the wireless device is configured.

In some embodiments, the wireless device assumes that aperiodic CSI-RS are not transmitted in a downlink pilot time slot in a case of frame structure type 2. In some embodiments, the wireless device assumes that aperiodic CSI-RS are not transmitted in subframes where transmission of the aperiodic CSI-RS would collide with a SystemInformationBlockType1 message. In some embodiments, the wireless device assumes that aperiodic CSI-RS are not transmitted in physical resource block pairs corresponding to the downlink control channel set with which the wireless device is configured in the subframe. In some embodiments, the wireless device assumes that aperiodic CSI-RS are not transmitted in physical resource block pairs carrying the downlink control channel associated with a trigger of the aperiodic CSI-RS using an aperiodic trigger. In some embodiments, the wireless device assumes that aperiodic CSI-RS are not transmitted in any resource elements, RE, carrying the downlink control channel associated with a trigger of the aperiodic CSI-RS using an aperiodic trigger. In some embodiments, the downlink control channel is an enhanced physical downlink control channel, EPDCCH, and a downlink control channel message is an EPDCCH message in a long term evolution communication system.

In some embodiments, a wireless device configured to avoid collision between downlink control channel and a channel state information reference signal, aperiodic CSI-RS, is provided. The wireless device includes a downlink control channel set configuration receiver module configured to receive signalling from a network node to configure the wireless device with a downlink control channel set. The wireless device also includes a downlink control channel set configuration module configured to configure the wireless device with a downlink control channel set according to signalling received from a network node. The wireless device further includes a aperiodic CSI-RS indication receiver module configured to receive from the network node on a physical control channel an indication of a presence of the aperiodic CSI-RS in a subframe. The wireless device also includes a aperiodic CSI-RS receiver module configured to receive the aperiodic CSI-RS based on the assumption that the aperiodic CSI-RS is not present in physical layer resources contained within the downlink control channel set.

In some embodiments, a method in a network node is provided. The method includes signalling a wireless device to configure the wireless device with a downlink control channel set that does not contain a aperiodic CSI-RS. The method also includes signalling to the wireless device a aperiodic CSI-RS, the presence of the aperiodic CSI-RS in a downlink channel so as to enable the wireless device to assume that the aperiodic CSI-RS is not present in physical layer resources contained within the downlink control channel set.

In some embodiments, the network node does not transmit the aperiodic CSI-RS to the wireless device in a subframe in the physical resource blocks, PRBs, corresponding to the downlink control channel set configured to the wireless device. In some embodiments, the network node indicates a presence of the aperiodic CSI-RS in the subframe and the wireless device does not assume that the aperiodic CSI-RS is not present in the downlink control channel set. In some embodiments, the network node indicates a presence of the aperiodic CSI-RS in the subframe and transmits the aperiodic CSI-RS in the subframe in all resource elements corresponding to the downlink control channel set.

In some embodiments, a network node is provided. The network node includes processing circuitry configured to signal to a wireless device to configure the wireless device with a downlink control channel set that does not contain a aperiodic CSI-RS. The transceiver is configured to signal to the wireless device a aperiodic CSI-RS, the presence of the aperiodic CSI-RS in a downlink channel so as to enable the wireless device to assume that the aperiodic CSI-RS is not present in physical layer resources contained within the downlink control channel set.

In some embodiments, the network node does not transmit the aperiodic CSI-RS to the wireless device in a subframe in the physical resource blocks, PRBs, corresponding to the downlink control channel set configured to the wireless device. In some embodiments, the network node indicates a presence of the aperiodic CSI-RS in the subframe and the wireless device does not assume that the aperiodic CSI-RS is not present in the downlink control channel set. In some embodiments, the network node indicates a presence of the aperiodic CSI-RS in the subframe and transmits the aperiodic CSI-RS in the subframe in all resource elements corresponding to the downlink control channel set.

In some embodiments, a network node is provided. The network node includes a transceiver module configured to signal to a wireless device to configure the wireless device with a downlink control channel set that does not contain a aperiodic CSI-RS. The transceiver module is also configured to signal to the wireless device a aperiodic CSI-RS, the presence of the aperiodic CSI-RS being in a subframe in a downlink channel so as to enable the wireless device to assume that the aperiodic CSI-RS is not present in physical layer resources contained within the downlink control channel set.

In some embodiments, the indication of a presence of the aperiodic CSI-RS indicates that the aperiodic CSI-RS is present in one of a subframe or a slot. In some embodiments, the indication of a presence of the aperiodic CSI-RS indicates that the aperiodic CSI-RS is present in a predetermined number of OFDM symbols.

In some embodiments, the aperiodic CSI-RS can be transmitted in the physical layer resources in at least some defined conditions.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a user equipment, the method comprising:
receiving an aperiodic channel state information reference signal, aperiodic CSI-RS, based on an assumption that the aperiodic CSI-RS is not present in physical layer resources corresponding to a downlink control channel set; and
at least one of:
receiving signalling to configure the user equipment for a downlink control channel set; and
receiving on a physical control channel an indication of a presence of the aperiodic CSI-RS; and
the user equipment also assuming that the aperiodic CSI-RS is not transmitted in physical resource blocks, PRBs, belonging to the downlink control channel set when the user equipment receives a downlink control channel message indicating that an aperiodic CSI-RS has been transmitted in the downlink control channel set.

2. A user equipment comprising:
a transceiver configured to:
receive an aperiodic channel state information reference signal (CSI-RS) based on an assumption that the aperiodic CSI-RS is not present in a physical layer resource corresponding to a downlink control channel set;
receive on a physical control channel an indication of a presence of the aperiodic CSI-RS; and
processing circuitry configured to:
configure the user equipment with the downlink control channel set; and
assume that the aperiodic CSI-RS is not transmitted in physical resource blocks, PRBs, belonging to the downlink control channel set when the user equipment receives a downlink control channel message indicating that an aperiodic CSI-RS has been transmitted in the downlink control channel set.

3. The user equipment of claim 2, wherein the processing circuitry is further configured to perform at least one of:
receive signalling to configure the user equipment with the downlink control channel set.

4. The user equipment of claim 2, wherein the indication of the presence of the aperiodic CSI-RS indicates that the aperiodic CSI-RS is present in one of a subframe or a slot.

5. The user equipment of claim 2, wherein when a presence of the aperiodic CSI-RS in a subframe is indicated by a downlink control channel, and the user equipment does not receive a downlink control channel message in the downlink control channel set, then the user equipment assumes that aperiodic CSI-RS is transmitted in the subframe in physical resource blocks, PRBs, corresponding to the downlink control channel set.

6. The user equipment of claim 2, wherein when a presence of the aperiodic CSI-RS in a subframe is indicated to the user equipment via a downlink control channel, and the user equipment does not receive a downlink control channel message that indicates that the aperiodic CSI-RS has been transmitted in the downlink control channel set, then the user equipment assumes that the aperiodic CSI-RS is contained in physical resource blocks, PRBs, corresponding to the downlink control channel set in a subframe.

7. The user equipment of claim 2, wherein the user equipment assumes that aperiodic CSI-RS is not transmitted in a subframe in physical resource blocks, PRBs, corresponding to the downlink control channel set with which the user equipment is configured regardless of whether a downlink control channel message is received in the downlink control channel set.

8. The user equipment of claim 2, wherein the user equipment assumes that the aperiodic CSI-RS is not transmitted in a subframe of physical resource blocks, PRBs, carrying a downlink control channel message to the user equipment when the user equipment receives a downlink control message in the subframe that indicates that the aperiodic CSI-RS has been transmitted.

9. The user equipment of claim 2, wherein when a presence of the aperiodic CSI-RS in a subframe is indicated by a downlink control channel and the user equipment does not receive a downlink control channel message, then the user equipment assumes the aperiodic CSI-RS is transmitted in the subframe in physical resource blocks, PRBs, corresponding to the downlink control channel set with which the user equipment is configured.

10. The user equipment of claim 2, wherein the user equipment assumes that a base station does not transmit aperiodic CSI-RS in physical resource blocks, PRBs, carrying a downlink control channel message to that user equipment when the user equipment receives a downlink control channel message that indicates that an aperiodic CSI-RS has been transmitted in the subframe.

11. The user equipment of claim 2, wherein when a presence of the aperiodic CSI-RS in a subframe is indicated to the user equipment via a downlink control channel, and the user equipment does not receive a downlink control channel message, then the user equipment assumes that aperiodic CSI-RS is transmitted to the user equipment in physical resource blocks, PRBs, corresponding to the downlink control channel set with which the user equipment is configured in the subframe.

12. The user equipment of claim 2, wherein when a presence of the aperiodic CSI-RS in a subframe is indicated by a downlink control channel, and the user equipment does not receive a downlink control channel message, then the user equipment assumes that the aperiodic CSI-RS can be transmitted in the subframe in all resource elements, REs, corresponding to the downlink control channel set with which the user equipment is configured.

13. The user equipment of claim 2, wherein the user equipment assumes that the aperiodic CSI-RS is not transmitted in a downlink pilot time slot, DwPTS, for frame structure type 2.

14. The user equipment of claim 2, wherein the user equipment assumes that the aperiodic CSI-RS is not transmitted in subframes where transmission of the aperiodic CSI-RS would collide with a SystemInformationBlockType1 message.

15. A base station configured for communication with a user equipment, the base station comprising:
processing circuitry configured to:
generate a signal to configure the user equipment with a downlink control channel set that does not contain an aperiodic channel state information reference signal (CSI-RS); and
generate an aperiodic CSI-RS, to be sent in a downlink channel to enable the user equipment to assume that the aperiodic CSI-RS is not present in physical resource blocks, PRBs, corresponding to the downlink control channel set;
assume that the aperiodic CSI-RS is not transmitted in physical resource blocks, PRBs, belonging to the downlink control channel set when the user equipment receives a downlink control channel message indicating that an aperiodic CSI-RS has been transmitted in the downlink control channel set; and
a transceiver configured to:
send the signal to configure the user equipment and send the aperiodic CSI-RS in the downlink channel; and
send an indication of a presence of the aperiodic CSI-RS.

16. The base station of claim 15, wherein the base station does not transmit the aperiodic CSI-RS to the user equipment in a subframe in the physical resource blocks, PRBs, corresponding to the downlink control channel set configured to the user equipment.

17. The base station of claim 15, wherein the base station indicates a presence of the aperiodic CSI-RS in a subframe and the user equipment does not assume that the aperiodic CSI-RS is not present in the downlink control channel set.

18. The base station of claim 15, wherein the base station indicates a presence of the aperiodic CSI-RS in a subframe and transmits the aperiodic CSI-RS in the subframe in all resource elements corresponding to the downlink control channel set.

* * * * *